US007555362B2

(12) United States Patent
Broussard et al.

(10) Patent No.: US 7,555,362 B2
(45) Date of Patent: Jun. 30, 2009

(54) ARTICLE DISPENSING AND COUNTING METHOD AND DEVICE

(75) Inventors: Brian Broussard, Lafayette, LA (US); Monroe Milton, Lecompte, LA (US); Michael Bergeron, Pineville, LA (US); Joseph Popovich, McMurray, PA (US); John Volkar, Amity, PA (US)

(73) Assignee: Parata Systems, LLC, Morrisville, NC (US)

( * ) Notice: Subject to any disclaimer, the term of this patent is extended or adjusted under 35 U.S.C. 154(b) by 273 days.

(21) Appl. No.: 11/442,104

(22) Filed: May 25, 2006

(65) Prior Publication Data

US 2006/0224274 A1 Oct. 5, 2006

Related U.S. Application Data

(62) Division of application No. 10/629,887, filed on Jul. 29, 2003, now Pat. No. 7,139,639.

(60) Provisional application No. 60/399,178, filed on Jul. 29, 2002, provisional application No. 60/428,580, filed on Nov. 22, 2002.

(51) Int. Cl.
*G06F 17/00* (2006.01)

(52) U.S. Cl. ........................ 700/244; 700/231; 700/232; 700/237; 700/240; 221/2; 221/9; 221/10; 221/12; 377/6

(58) Field of Classification Search ......... 700/231-244; 221/1-312 C; 377/6
See application file for complete search history.

(56) References Cited

U.S. PATENT DOCUMENTS 3,045,864 A 7/1962 Hurst et al.
3,170,627 A 2/1965 Pearson et al.
3,215,310 A 11/1965 Hurst et al.
3,266,664 A 8/1966 Pearson et al.
3,368,713 A 2/1968 Hurst et al.
3,392,853 A 7/1968 Mitchell et al.
3,837,139 A 9/1974 Roseburg
4,018,358 A 4/1977 Johnson et al.

(Continued)

FOREIGN PATENT DOCUMENTS

EP 0 761 197 A1 12/1997

(Continued)

*Primary Examiner*—Gene Crawford
*Assistant Examiner*—Michael K Collins
(74) *Attorney, Agent, or Firm*—Myers Bigel Sibley & Sajovec

(57) ABSTRACT

One embodiment of the present invention includes a system comprising a housing having an upper end and a lower end. The housing carries a plurality of movable blades defining an entry aperture proximate to the upper end, an exit aperture proximate to the lower end, and a chamber there between. An adapter may be provided for connection to the housing and for receiving an article storage container. The upper end of the housing carries a sensor responsive to the presence and absence of the article storage container. A memory device carries information about the presence and absence of the article storage container. An article determining and actuating station has electronics for interrogating the memory device, for controlling the plurality of blades and for determining the number of items dispensed. A receptacle collects articles that have been dispensed. Methods of associating a flow control device with an article storage container and of dispensing items are also disclosed.

12 Claims, 23 Drawing Sheets

U.S. PATENT DOCUMENTS

| | | | | |
|---|---|---|---|---|
| 4,111,332 | A | 9/1978 | Hurst et al. | |
| 4,171,065 | A | 10/1979 | Hurst | |
| 4,247,019 | A * | 1/1981 | Lerner | 222/56 |
| 4,382,527 | A | 5/1983 | Lerner | |
| 4,597,091 | A | 6/1986 | Blake | |
| 4,675,520 | A | 6/1987 | Harrsen et al. | |
| 4,697,721 | A | 10/1987 | Johnson et al. | |
| 4,743,760 | A | 5/1988 | Giles | |
| 4,869,394 | A | 9/1989 | Hurst | |
| 4,885,784 | A | 12/1989 | Miyagawa et al. | |
| 5,042,685 | A * | 8/1991 | Moulding et al. | 221/1 |
| 5,259,531 | A | 11/1993 | Bennett | |
| 5,313,508 | A | 5/1994 | Ditman et al. | |
| 5,337,919 | A * | 8/1994 | Spaulding et al. | 221/2 |
| 5,463,839 | A | 11/1995 | Stange et al. | |
| 5,473,703 | A | 12/1995 | Smith | |
| 5,549,217 | A | 8/1996 | Benarrouch | |
| 5,564,593 | A | 10/1996 | East, Sr. | |
| 5,638,417 | A * | 6/1997 | Boyer et al. | 377/7 |
| 5,671,262 | A | 9/1997 | Boyer et al. | |
| 5,671,592 | A | 9/1997 | Yuyama et al. | |
| 5,713,487 | A | 2/1998 | Coughlin | |
| 5,762,235 | A | 6/1998 | Coughlin | |
| 5,768,327 | A | 6/1998 | Pinto et al. | |
| 5,787,678 | A | 8/1998 | Koike et al. | |
| 5,812,410 | A * | 9/1998 | Lion et al. | 700/231 |
| 5,838,575 | A * | 11/1998 | Lion | 700/231 |
| 5,860,563 | A | 1/1999 | Guerra et al. | |
| 5,884,806 | A | 3/1999 | Boyer et al. | |
| 5,897,024 | A | 4/1999 | Coughlin et al. | |
| 5,907,493 | A * | 5/1999 | Boyer et al. | 700/231 |
| 5,930,145 | A | 7/1999 | Yuyama et al. | |
| 6,053,302 | A | 4/2000 | Leu et al. | |
| 6,085,938 | A | 7/2000 | Coughlin | |
| 6,109,193 | A | 8/2000 | Crabb et al. | |
| 6,161,721 | A | 12/2000 | Kudera et al. | |
| 6,208,911 | B1 | 3/2001 | Yamaoka et al. | |
| 6,256,967 | B1 | 7/2001 | Hebron et al. | |
| 6,263,259 | B1 | 7/2001 | Bartur | |
| 6,318,630 | B1 | 11/2001 | Coughlin et al. | |
| 6,343,711 | B1 | 2/2002 | Coughlin | |
| 6,370,215 | B1 | 4/2002 | Pinto et al. | |
| 6,377,648 | B1 | 4/2002 | Culbert | |
| 6,398,637 | B1 | 6/2002 | Tsuchida | |
| 6,563,901 | B2 * | 5/2003 | Wooldridge | 377/11 |
| 6,592,005 | B1 * | 7/2003 | Coughlin et al. | 221/129 |
| 6,702,146 | B2 | 3/2004 | Varis | |
| 6,776,703 | B2 | 8/2004 | Abe et al. | |
| 6,799,684 | B2 * | 10/2004 | Wooldridge | 209/551 |
| 6,985,798 | B2 * | 1/2006 | Crowder et al. | 700/240 |
| 7,048,141 | B2 * | 5/2006 | Abdulhay et al. | 221/3 |
| 7,099,741 | B2 * | 8/2006 | Baranowski | 700/240 |
| 7,118,006 | B2 * | 10/2006 | Williams et al. | 221/5 |
| 7,139,639 | B2 * | 11/2006 | Broussard et al. | 700/225 |
| 2001/0027634 | A1 | 10/2001 | Hebron et al. | |

FOREIGN PATENT DOCUMENTS

| | | |
|---|---|---|
| WO | WO 02/17850 A1 | 3/2002 |
| WO | WO 02-30789 A1 | 4/2002 |

* cited by examiner

*Fig.23A*
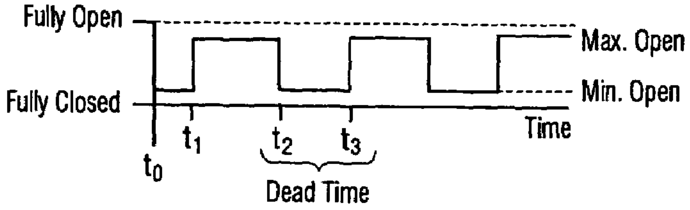
*Fig.23B*
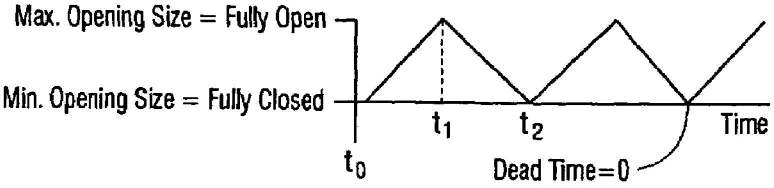
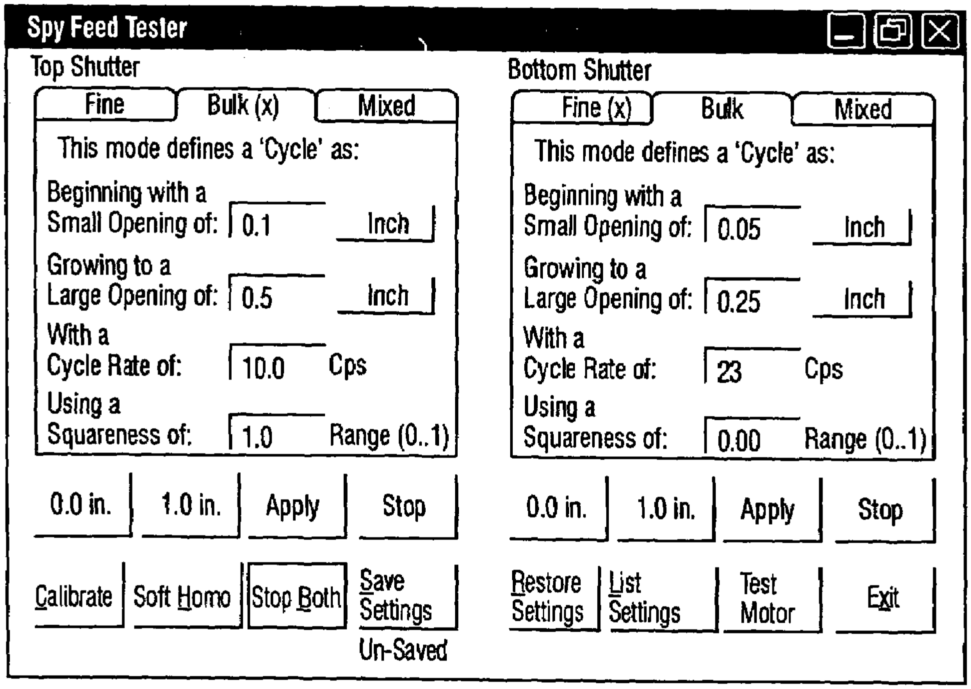
*Fig.24*

ARTICLE DISPENSING AND COUNTING METHOD AND DEVICE

CROSS REFERENCE TO RELATED APPLICATIONS

This application is a divisional application of U.S. nonprovisional application Ser. No. 10/629,887 filed Jul. 29, 2003 now U.S. Pat. No. 7,139,639 entitled Article Dispensing and Counting Method and Device, which is hereby incorporated herein in its entirety by reference, and which claims priority from U.S. provisional application Ser. No. 60/399,178 filed Jul. 29, 2002 entitled Article Dispensing and Counting Method and Device, the entirety of which is hereby incorporated by reference, and U.S. provisional application Ser. No. 60/428,580 filed Nov. 22, 2002 entitled Hinged Medicine Bottle Closure, the entirety of which is hereby incorporated by reference.

BACKGROUND OF THE INVENTION

The present invention is directed to a device and a method of dispensing and determining the number of articles, such as drugs or other items, dispensed.

Historically, prescriptions are filled using one of two different methods. According to one method, a pharmacist hand dispenses the required drugs from a bulk supply. There are obvious advantages to this method. For narcotics and other stringently controlled drugs, the pharmacist can use his/her discretion to count and possibly recount the dispensed pills to ensure accuracy. Unfortunately, this method's quality and accuracy are highly dependant on the individual pharmacist. The method is very labor intensive and subject to human inaccuracies. It is time consuming because the pharmacist typically must locate the drug, open the bulk supply (e.g., stock bottle), pour out a rough amount of the drug, hand count the specific number of pills required for the prescription, possibly recount the pills, gather the selected pills, place the pills into the prescription pill bottle, vial, or other container, place the non-prescribed pills back into the bulk supply, locate the lid and cap the bulk supply, return the bulk supply to the shelves, and label and cap the bottle, vial, or other container. Each of these steps is affected by the speed and accuracy of the pharmacist and varies among pharmacists and for an individual pharmacist over the course of the day, week, or month.

The second method of dispensing pills entails using an automated prescription dispensing or filling apparatus. Automated prescription dispensing devices are generally more consistent and accurate than pharmacists, but there are several disadvantages to those presently on the market. Most of those devices dispense pills at one constant rate, either fast or slow. Fast (or bulk) dispensing entails the movement of more than one pill at a time from an article storage container into a receptacle. Slow dispensing entails the movement of fewer pills at a time from an article storage container into a receptacle. Singulation of the items enables the movement of one pill at a time from a storage container to a receptacle.

Bulk dispensing has an obvious speed advantage, which translates into cost and efficiency advantages. The disadvantages of bulk dispensing arise in the counting of the dispensed pills. Most pill dispensers work in association with a pill counting apparatus. Contemporary technological and cost limitations imposed upon standard pill counting apparatus translate into decreased count accuracy with increased dispensing speed.

Singulation, and the attendant slower dispensing rates, results in decreased speed and perhaps decreased cost and efficiency, but count accuracy increases greatly when only one pill at a time moves past a counting device. This is important for the success of all pill dispensing, pill counting, and prescription filling technologies, but it is essential to the successful dispensing of highly controlled drugs.

Therefore, one problem facing the pharmacy, healthcare and other industries today, is how to combine the speed of bulk dispensing with the count accuracy of singulation. Another problem centers on the pharmacy's need to track what drug (type, brand, lot, etc.) is in which storage container, who replenished the container, when the container was replenished, the inventory level at the time of replenishment and who dispensed the product. Also, automated dispensing systems need to be usable by lesser-skilled employees. Often a technician, not a pharmacist, is called upon to operate, clean or repair the counting and dispensing system. Thus, the automated counting and dispensing system should be intuitive and easy to use. The need exists for a counting and dispensing system that satisfies these needs.

BRIEF SUMMARY OF THE INVENTION

The present invention is directed to a flow control device for dispensing small articles such as, but not limited to, drugs or other items. In one embodiment, the present invention is directed to a device comprising a housing carrying an upper plurality of blades and a lower plurality of blades. The upper plurality of blades defines an entry aperture; the upper plurality of blades is movable with respect to one another. The lower plurality of blades is set off from the upper plurality of blades to define a chamber between the two pluralities of blades. The lower plurality of blades defines an exit aperture and the blades move with respect to one another. In certain embodiments, the upper plurality of blades may be eliminated, may be replaced by a gate or single blade, and or moved to a structure outside the housing. In certain embodiments, the lower plurality of blades may be replaced by a gate or single blade and or moved to a structure outside the housing.

In another embodiment, the flow control device is comprised of a housing having an entry aperture and an exit aperture. A metering device is carried by the housing and controls the entry aperture. A lower blade is carried by the housing and controls the exit aperture. A chamber is formed between the entry aperture and the exit aperture. A separation device is optionally positioned between the entry aperture and the exit aperture to aid in the proper orientation of articles with respect to the exit aperture. One or more sensors may be positioned in the chamber or adjacent to one or more of the apertures for one of counting, article identification, detecting fragments, detecting orientation and controlling the metering device, among others.

The present invention is also directed to a system built around the aforementioned flow control devices. In such systems, the flow control device carries a memory. An article storage container attaches to the flow control device. An article determining and actuating station has electronics for interrogating the memory, for controlling the flow control device and for determining the number of dispensed articles. A receptacle collects the dispensed articles.

The present invention is also directed to a combination comprising a housing having an upper end and a lower end and a chamber there between. An adapter for connection to the housing and for receiving an article storage container may be provided. The upper end of the housing has a device responsive to the presence and absence of an article storage container connected to the adapter.

The present invention is also directed to a combination comprising a flow control device carrying a memory and an article storage container connected to the flow control device. The memory contains information associating the flow control device and the connected container.

The present invention encompasses a method of dispensing articles comprising dispensing articles at a first rate, determining the number of articles dispensed, and dispensing articles at a second rate, lower than the first rate, in response to the number of articles dispensed.

The present invention encompasses a method of dispensing articles comprising connecting a flow control device having an article storage container associated therewith to a station. The flow control device is interrogated. The interrogation information controls the dispensing of articles at a first rate. The number of dispensed articles is determined. The first rate of dispensing may be changed or controlled based on the current number of articles dispensed. After being dispensed, the articles are collected in a receptacle.

Another dispensing method of the present invention comprises connecting a flow control device, having an article storage container associated therewith, to a station; interrogating the flow control device; setting the minimum and maximum sizes of an entry aperture of the flow control device based on the interrogating; setting the minimum and maximum sizes of an exit aperture of the flow control device based on the interrogating; varying the sizes of the entry aperture and exit aperture between the minimum and maximum sizes; counting or otherwise determining the number of articles dispensed; and collecting the articles after they have been dispensed.

The present invention is also directed to a method of associating a flow control device with an article storage container comprising: reading device identification information from a flow control device; storing the device identification information; reading article storage container identification information; and storing the article storage container identification information so as to be linked with the stored device identification information. The device and the article storage container may then be mechanically connected together.

The present invention solves many of the problems of current article dispensing and counting technologies. The present invention combines the advantages of bulk flow and singular flow in one device. The present invention encompasses filling a portion of a prescription using bulk flow to achieve speed and efficiency. Then, part way through the dispensing, the article flow rate decreases to a slower rate or to a singular flow rate allowing for the accurate count of the final pills for the prescription. For highly controlled drugs, the entire prescription can be filled via singular flow for additional accuracy. For less controlled prescriptions, like vitamins, the entire prescription can be filled via bulk flow. Features, such as the ability to relate an article storage container to a flow control device, enable a pharmacist to ensure that the proper pills are dispensed. Provision of a memory device allows a dispensing history to be created and stored thus providing an audit trail. The memory device may also contain information about the flow control device and articles in the associated storage container. The system of the present invention provides for a dense storage of articles in a manner which is easily scaled. Those advantages and benefits, and others, will be apparent from the Description of the Invention herein below.

BRIEF DESCRIPTION OF THE DRAWINGS

For the present invention to be easily understood and readily practiced, the present invention will now be described, for purposes of illustration and not limitation, in conjunction with the following figures, wherein:

FIG. 12A diagrammatically illustrates two blades which have moved apart creating a shutter opening for a pill to fall through;

FIGS. 23A and 23B illustrate blade position vs. time profiles;

FIG. 24 illustrates an input screen for identifying parameters for controlling the blades;

DESCRIPTION OF THE INVENTION

Figure 2:
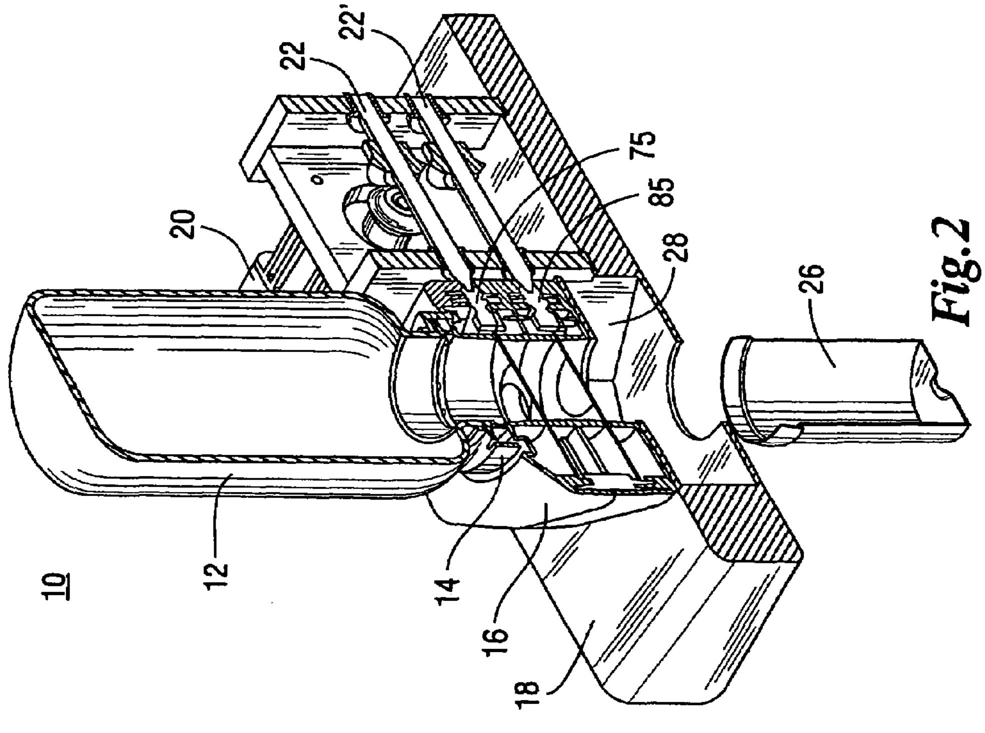
FIG. 2 is a cross-sectional view of the system shown in FIG. 1.
Figure 1:
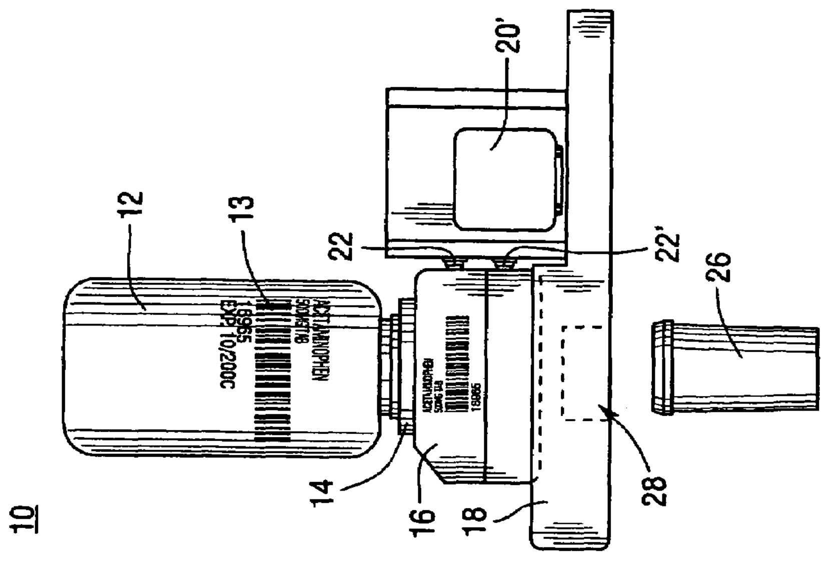
FIG. 1 illustrates a dispensing system constructed according to the teachings of the present invention.

The present invention is directed to a flow control device, the flow control device in combination with other components, a dispensing system based on such a flow control device, and methods of operating the flow control device, combinations of components and dispensing systems. A dispensing system 10 constructed according to the present invention is shown in full in FIG. 1, in cross-section in FIG. 2, and in an exploded, partial cross-section in FIG. 3. As shown in FIGS. 1 and 2, the dispensing system 10 comprises an article storage container 12 (e.g. a stock bottle) connected to an adapter 14 that connects to a flow control device 16. Article storage container 12 may carry a label 13 which may include a drug number (NDC, DIN, etc.), bar code indicia, human readable indicia, printable RF identification tag, expiration date, among others. Article storage container may also carry an RF identification tag (not shown). Device 16 may also carry a label 17, which may contain some or all of the same information as label 13, as well as information unique to device 16, information about the articles in storage container 12 and information about dispensing history. Device 16 may also carry an RF identification tag (174 in FIG. 16) in the form of a wedge or cylindrical shaped device.

The system 10 is described in connection with the dispensing of drugs. The term drug, as used herein, refers to any regulated or non-regulated pharmaceutical medication or over-the-counter medication regardless of its form (e.g., capsule, pill, ointment, etc.). The apparatus and method of the present invention are also applicable to other articles and products (e.g., nuts, bolts, screws, etc.). Reference to "item" should be considered to include drugs as well as such other articles and products unless the context dictates otherwise.

The container 12, which may optionally have a threaded neck (not shown) and device 16 may be connected to an article determining and actuating station 18. When the device 16 is connected to the station 18, the device 16 is connected to an upper motor 20 through an upper drive shaft 22 and a lower motor 20' through a lower drive shaft 22'. A receptacle such as vial 26, a bag, unit dose package, blister pack, or other customer specific form of delivery, collects articles as they pass through a counting zone 28 or are otherwise dispensed.

Figure 3:
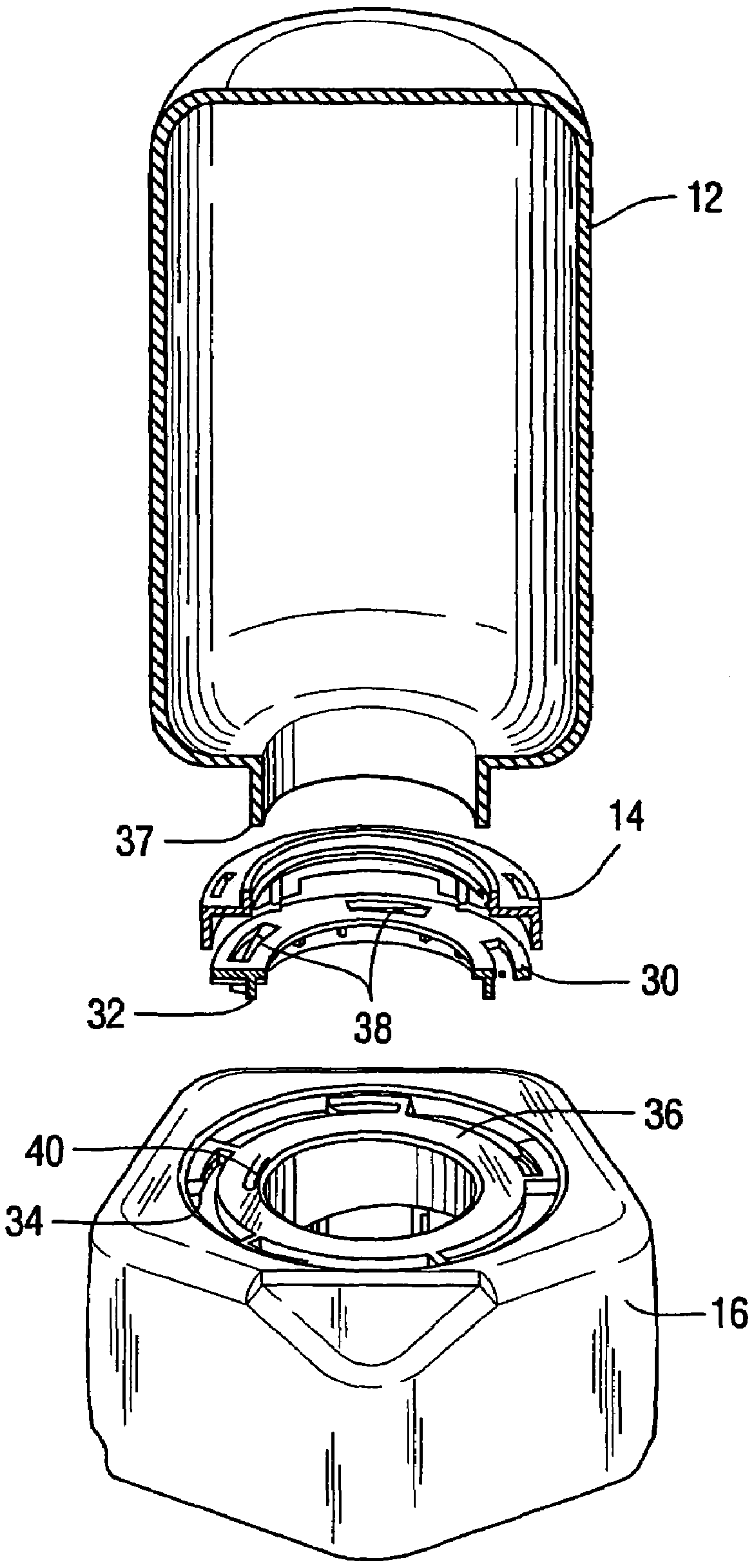
FIG. 3 is an exploded view, partially in cross-section, of the flow control device, plate, adapter, and an article storage container.

The details of the connection between the article storage container 12 and the device 16 are shown in FIG. 3. In FIG. 3 the article storage container 12 is connected to the adapter 14 either by virtue of threads on the outside of the neck of container 12 (not shown) or by a snap fit. The adapter 14 is provided so that article storage containers 12 having necks of varying diameter may be used in combination with a single sized device 16. A set of adapters 14 of varying sizes may be provided so that all sizes of article storage containers 12 may be accommodated.

The adapter 14 captures a plate 30. The bottom of the plate 30 carries an attachment mechanism 32 which is configured to mate with a complementary attachment mechanism 34 carried on a top surface 36 of the device 16. Plate 30 also carries flexible fingers 38 which holds plate 30 above the top surface 36 of device 16.

When the article storage container 12 is securely threaded or otherwise inserted into the adapter 14, and the adapter 14 is twist-locked into the device 16, a surface 37 of the article storage container 12 will push against an upper surface of the plate 30. When the surface 37 of the article storage container exerts a downward force on plate 30, the flexible fingers 38 bend so as to compress the fingers 38 until the bottom surface of plate 30 comes into contact with the top surface 36 of the device 16. When that occurs, a switch 40 is depressed. In that manner, the plate 30 has a depressed position in which the switch 40 is also depressed, and a non-depressed position, in which the switch 40 is non-depressed.

If the adapter 14 and the article storage container 12 are removed from the device 16, the plate 30 will no longer be in position to depress the switch 40. If the article storage container 12 is removed from the adapter 14 while the adapter 14 is left attached to the device 16, flexible fingers 38 will urge the plate 30 upward such that the plate 30 will no longer be in its depressed position such that the switch 40 will assume its non-depressed position. In that manner, either removal of the article storage container 12 and adapter 14, or just the removal of the article storage container 12, will cause the switch 40 to assume its non-depressed position.

The switch 40 is one example of a device which is responsive to the presence or absence of the article storage container 12 in the adapter 14. Other types of switches and sensors may be used to provide that function. In some embodiments, the switch 40 or other similar device may be directly responsive to the surface 37 of the storage container 12 without the use of plate 30. The significance of the position of the switch 40 is described below.

Figure 4:
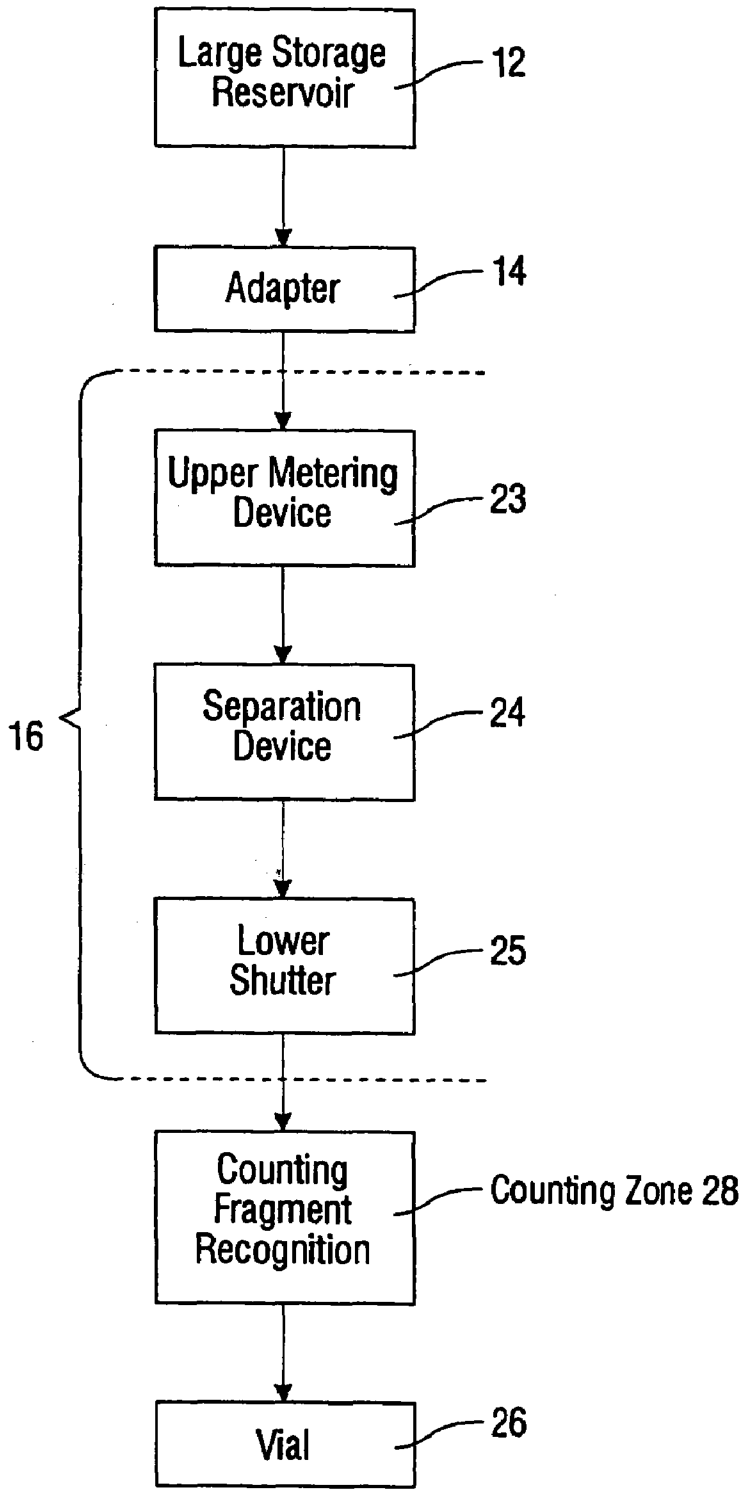
FIG. 4 is a block diagram of the architecture of the present invention.
Figure 6:
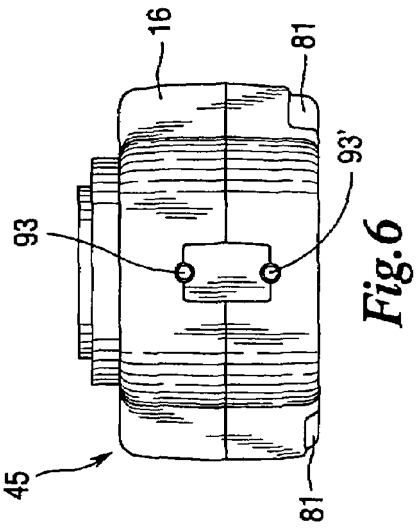
FIGS. 6 and 7 are additional views of the flow control device of FIG. 5.
Figure 7:
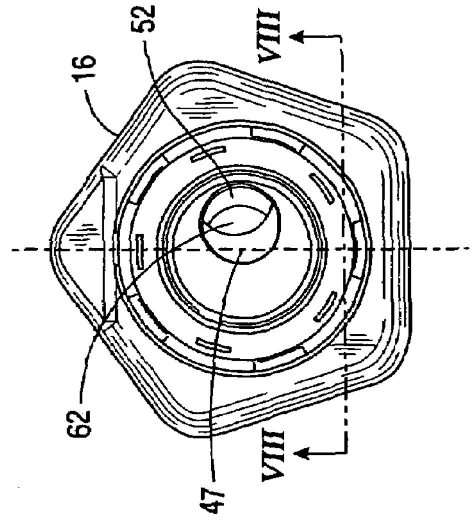

FIG. 4 is a block diagram of the architecture of the present invention. As shown in FIG. 4, a large storage reservoir is provided, which may be, for example, article container or stock bottle 12. If necessary, the adapter 14 may be provided. The device 16 may be comprised of an upper metering device 23 for the purpose of separating a small amount of pills out of the large reservoir of pills 12. The upper metering device 23 may take the form of a pair of blades forming a shutter, as will be described below, an iris, or a simple gate or valve. An iris is a device comprised of a plurality of blades. In the case of an iris, as the size of the opening formed by the blades changes, the configuration or shape of the opening does not change. In certain embodiments, the upper metering device may be eliminated altogether or moved into the adapter 14.

After the upper metering device 23, a separation device 24 is provided to separate the small group of pills and to properly orient each pill so that they are easier to singulate. The separation device 24 may be implemented using a gravity slide that uses the configuration of the slide and gravity to both orient the pills and space them out for easier singulation. The separation device 24 greatly lowers the statistical variances of the input variables to the lower shutter 25 so as to enable higher singulation rates. The separation device 24 is further discussed in conjunction with FIGS. 14A and 14B. Although the separation device 24 is preferably employed, it may be eliminated in certain embodiments.

The lower shutter 25 may take the form of a pair of blades forming a shutter as discussed below in conjunction with FIG. 5. Alternatively, the lower shutter 25 may take the form of an iris. The operation of the lower shutter 25 will depend upon whether the upper metering device 23 and/or the separation device 24 is provided within device 16.

Counting and fragment recognition 26 may be performed within counting zone 28 although those of ordinary skill in the art will recognize that such functions could be performed within device 16. Thus, FIG. 4 is designed to illustrate the various processes that are performed. It is not intended to indicate that each and every process is necessary for all embodiments, or that each of the processes is performed within the component illustrated in FIG. 4.

Various views of one embodiment of the flow control device 16 are illustrated in FIGS. 5 through 9. As shown in FIGS. 5-9, and as seen best in FIG. 5, the device 16 is comprised of an upper housing member 42 and a lower housing member 44 forming a housing 45. The housing 45 carries an upper set of blades 47, 49 which may be at an angle 50 (See FIG. 9) with respect to a horizontal reference. The upper set of blades 47, 49 defines an entry aperture 52 (See FIG. 7). The blades 47, 49 move with respect to one another, as will be described herein below, thereby allowing for variation in and adjustments of the size of the entry aperture 52 and agitation of the articles being dispensed. The housing 45 also carries a lower set of blades 57, 59 which may be at an angle 60 (See FIG. 9) with respect to the horizontal reference. The lower set of blades 57, 59 defines an exit aperture 62 (See FIG. 7). The blades 57, 59 move with respect to one another, allowing for the adjustment of and variation in the size of the exit aperture 62 and agitation of the articles being dispensed. The lower set of blades 57, 59 is set off from the upper set of blades 47, 49 to define a chamber 64 there between. The entry aperture 52 and the exit aperture 62 may have centers that are offset from one another or the centers may be in line with one another. The angle 50 of the upper set of blades 47, 49 with respect to the horizontal is preferably between ten and forty-five degrees. Similarly, the angle 60 of the lower set of blades 57, 59 with respect to the horizontal is preferably between ten and forty-five degrees and was fifteen degrees in the current embodiment.

The individual blades 47, 49 of the upper set of blades and the individual blades 57, 59 of the lower set of blades may be of a variety of shapes and sizes depending on the size and shape of the articles to be dispensed, and may be constructed of a variety of materials, depending upon the composition of the articles passing through the apertures 52 and 62. The material used for the blades 47, 49 of the upper set of blades, for the blades 57, 59 of the lower set of blades, and for the housing 45 typically includes anti-static properties. By using materials having anti-static properties, the build-up of static electricity due to the blades interacting with the articles, especially drug capsules, is prevented. Should static electricity build-up occur, some small or lightweight drugs will adhere or be attracted to the blades and housing thus preventing proper singulation and counting. Proper operation is impacted by pills not free falling from the blade opening, sticking to the housing, sticking to the blade, or even levitating above the blades. An electrical ground path (not shown) may be provided between the housing 45 and an earth ground to dissipate any static electricity generated by the operation of the blades.

Figure 10A:
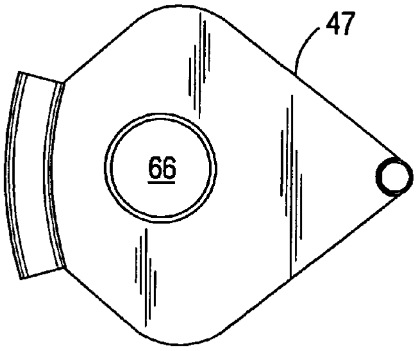
FIGS. 10A-10D illustrate four possible blade configurations.
Figure 10B:
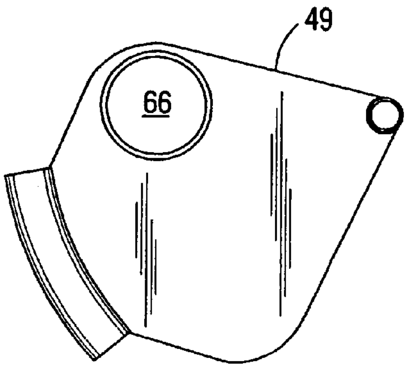

Each of the blades 47, 49 of the upper set of blades may have a circular opening 66 therein, as shown in FIGS. 10A and 10B, respectively. Alternatively, one of the blades 47, 49 of the upper set of blades may have a circular opening while the other blade of the upper set of blades may have a semi-circular opening therein. As mentioned, the size and shape of the openings 66 will depend upon the size, shape and composition of the articles to be dispensed. Although the leading edges of the blades 47, 49 are shown as being flat, various configurations, such as an upturned leading edge, may be employed. Additionally, the upper surface of the blades 47, 49 may be configured to cause friction or carry devices (not shown) to provide a stirring action.

Figure 10C:
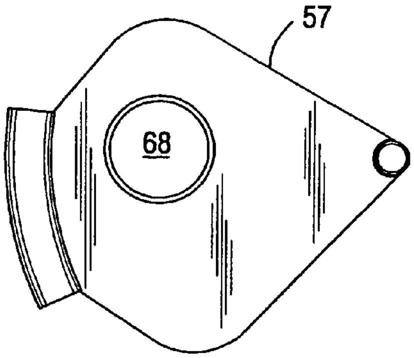
Figure 10D:
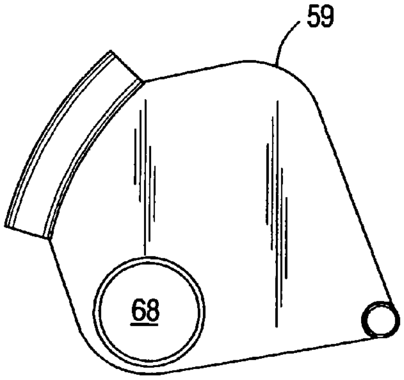

Similarly, each of the blades 57, 59 of the lower set of blades may have a circular opening 68 therein, as shown in FIGS. 10C and 10D, respectively. Alternatively, one of the blades 57, 59 of the lower set of blades may have a circular opening while the other blade of the lower set of blades may have a semi-circular opening therein. As mentioned, the size and shape of the openings 68 will depend upon the size, shape and composition of the articles to be dispensed. Although the leading edges of the blades 57, 59 are shown as being flat, various configurations, such as an upturned leading edge, may be employed. Additionally, the upper surface of the blades 57, 59 may be configured to cause friction. Such an embodiment is more likely to be beneficial when the separation device 24 of FIG. 4 is not provided as it will then be more likely that the pills will need to be agitated into the proper orientation for passage through the opening 62 formed by blades 57, 59.

In the present embodiment, the juxtaposition of the opening 66 in blade 47 with the opening 66 in blade 49 forms the entry aperture 52. Similarly, the juxtaposition of the opening 68 in blade 57 with the opening 68 in blade 59 forms the exit aperture 62.

Figure 11A:
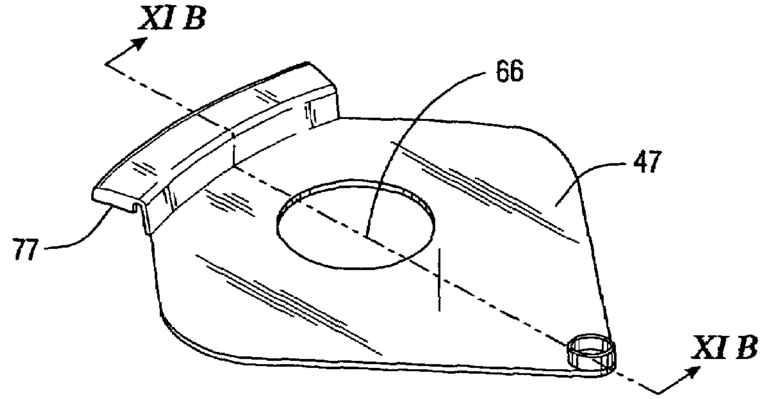
FIGS. 11A-11D illustrate four views of the blade of FIG. 10A.
Figure 11B:
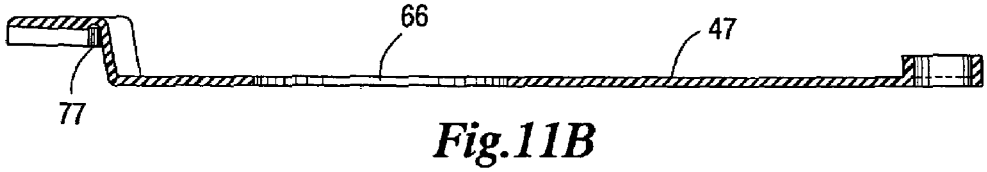
Figure 11C:
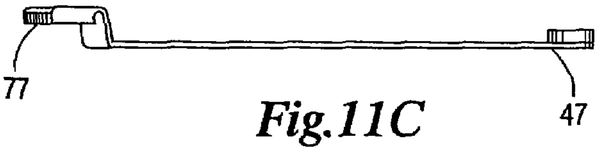
Figure 11D:
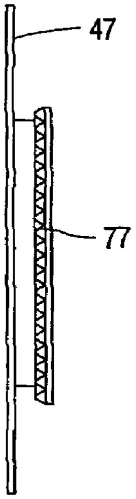

The blade 47 of FIG. 10A, which is representative of the other blades, is shown in perspective in FIG. 11A, in cross section in FIG. 11B, and in a side view and an end view in FIGS. 11C and 11D, respectively. "Blades" as used herein is not limited to the type of blades illustrated in FIGS. 10 and 11 or the other figures. Any type of member, such as the members of an iris, which cooperate to form an opening, or a single member, such as a guillotine valve, are intended to be covered by the term "blade" and any group of such members is intended to be cover by the phrases "set of blades" or "plurality of blades."

Returning now to FIG. 5, the upper set of blades 47, 49 may be designed to pivot about an upper pivot point 70. Similarly, the lower set of blades 57, 59 may be designed to pivot about a lower pivot point 72. In one preferred embodiment of the present invention, the upper pivot point 70 and the lower pivot point 72 lie along a common vertical line. The upper and lower pivot points can be positioned in a manner other than along a common vertical line and still be in keeping with the present invention. Additionally, the present invention can be designed in a variety of other ways such that either or both of the sets of blades move laterally or, in the case of an iris, need not pivot at a single point.

The upper blades 47, 49 each have a set of teeth 77, 79, respectively, formed therein. An upper drive pinion 75 has a tapered toothed portion 91, a ring-shaped stop portion 92, and a head portion 93. The upper drive pinion 75 is rotatably supported by the housing 45 such that the tapered toothed portion 91 is positioned between the sets of teeth 77, 79 The lower blades 57, 59 each have a set of teeth 87, 89, respectively, formed therein. A lower drive pinion 85 has a tapered toothed portion 91', a ring-shaped stop portion 92', and a head portion 93'. The lower drive pinion 85 is rotatably supported by the housing 45 such that the tapered toothed portion 91' is positioned between the sets of teeth 87, 89. Each of the pinion's head portions are configured (See FIG. 6) such that the upper drive pinion 75 receives upper drive shaft 22 while lower drive pinion 85 receives lower drive shaft 22' (See FIG. 2).

Each pinion 75, 85 mates with one of the shafts 22, 22, respectively, when the flow control device 16 is properly seated within station 18. Notches 81, seen in FIG. 6, may be used to aide in the left/right alignment of flow control device 16 in station 18. When the flow control device 16 is properly seated within station 18, head portions 93, 93' will be aligned with shafts 22, 22', respectively. The shafts 22, 22' are spring-loaded to facilitate engagement with heads 93, 93', respectively. Usually, the drive shafts 22, 22' must start rotating before the drive shaft hex keying can achieve the proper orientation to seat within the heads 93, 93', respectively.

Alternatively, the upper drive pinion 75 may be supported by the housing 45 to allow the upper drive pinion 75 to be displaced laterally between an operating position in which the toothed portion 91 engages sets of teeth 77, 79 such that rotation of said upper pinion 75 causes the upper set of blades 47, 49 to move relative to one another, and an inoperative position in which rotation of the drive pinion 75 does not cause movement of the blades 47, 49. The degree of lateral travel of drive pinion 75 is determined by the ring-shaped stop portion 92 interacting with the housing 45. A spring, not shown, may bias the drive pinion 75 into the inoperative position such that insertion of the drive shaft 22 is necessary to overcome the force of the spring and urge the upper drive pinion 75 into the operating position. The lower drive pinion 85 operates in a manner similar to that described above in conjunction with the upper drive pinion 75.

Figure 5:
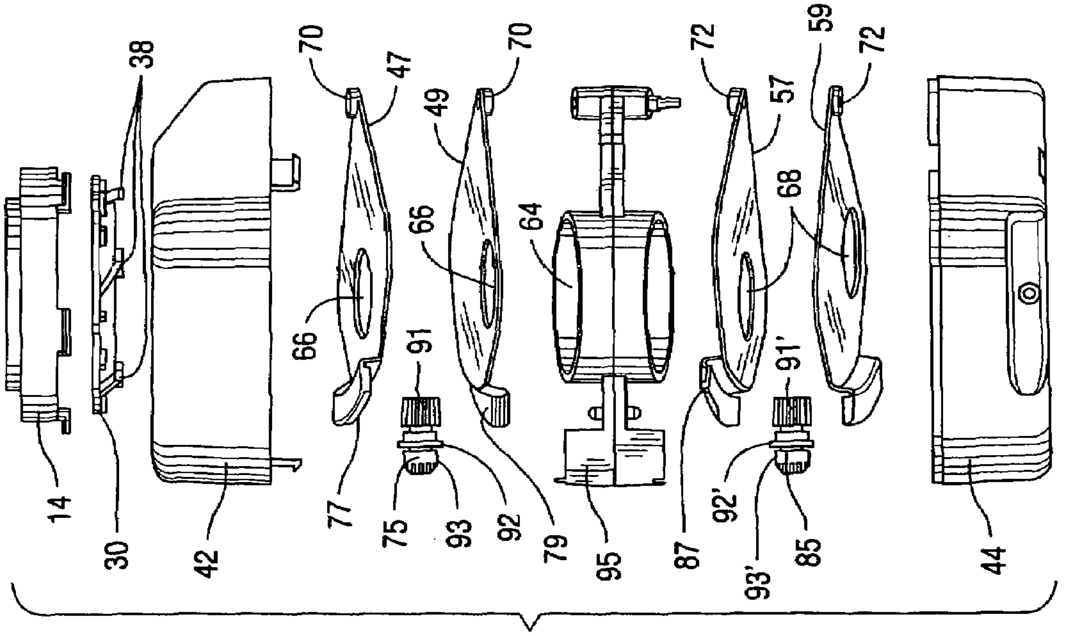
FIG. 5 is an exploded view of the flow control device, plate, and adapter used in the system of FIG. 1.
Figure 8:
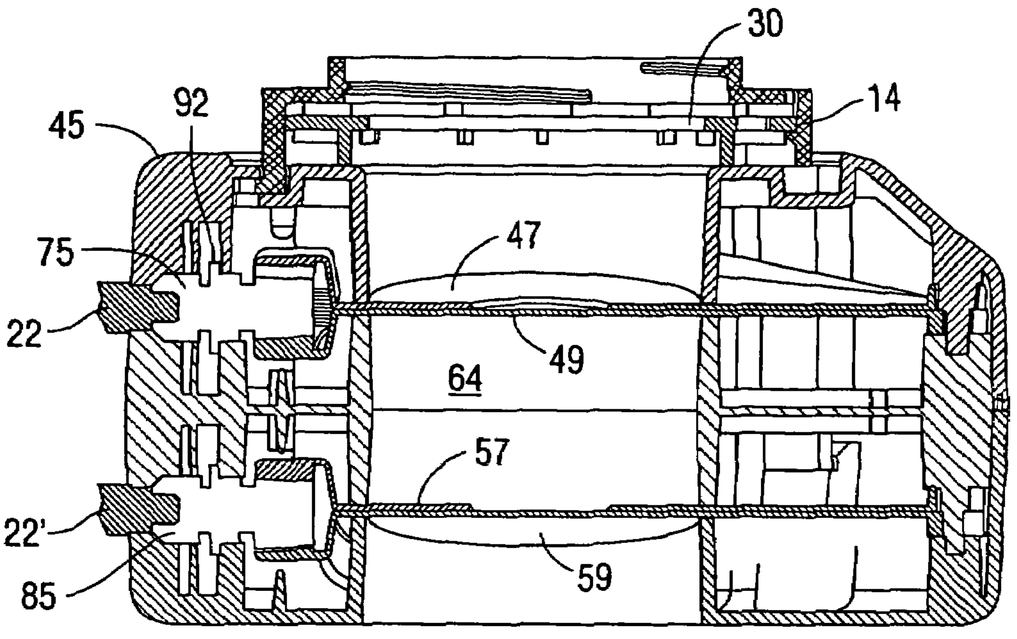
FIGS. 8 and 9 are cross-sectional views of the flow control device of FIG. 7 taken along the lines VIII-VIII and IX-IX, respectively.
Figure 9:
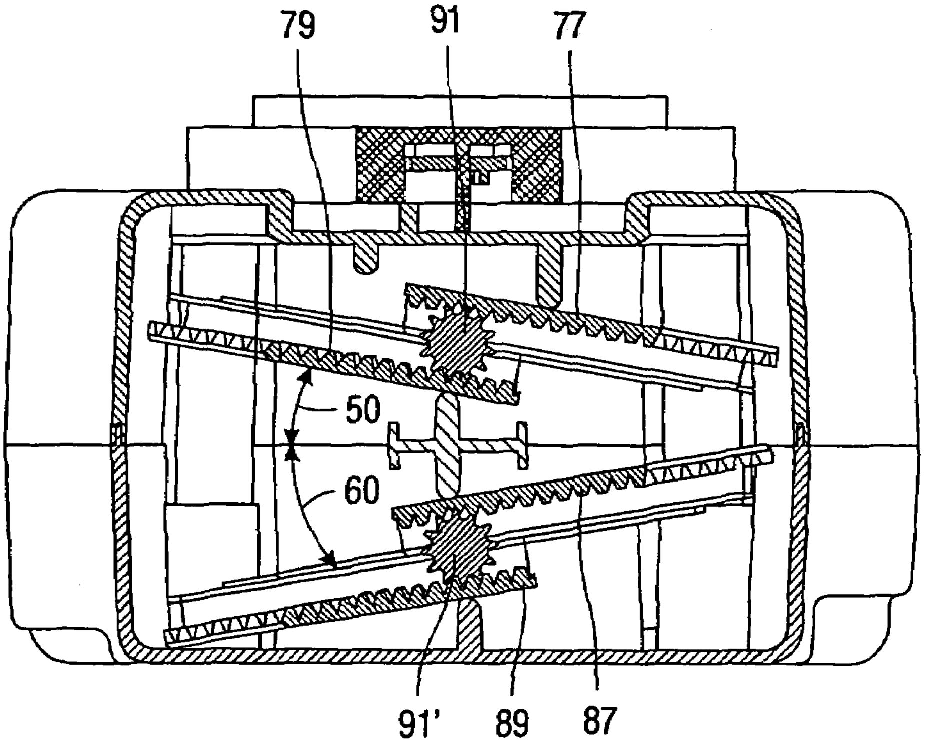

Completing the description of FIG. 5, a spacer 95 is positioned between the blades 49 and 57 to define the offset between the upper set of blades and the lower set of blades and the angle, if any, of the upper and lower sets of blades with respect to the horizontal reference. The spacer 95 may be designed to help support the blades, define pivot points 70, 72 or provide other functions depending upon the design of the inside of the upper housing 42 and lower housing 44.

Figure 12A:
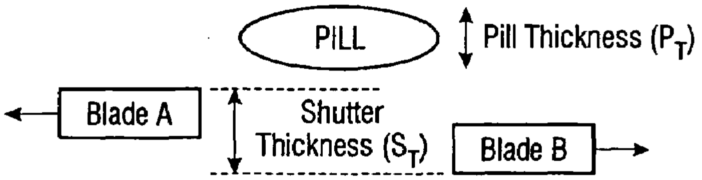

The time required to drop a pill through a shutter opening can be calculated for any set of pill dimensions using an algebraic equation which will be derived below. FIG. 12A illustrates diagrammatically a pill that is ready to drop through a hole created when two blades cooperate to form a shutter opening. The distance the pill must drop to clear the hole is equal to:

$$D=P_T+S_T$$

where D=total distance dropped, $P_T$=pill thickness, and $S_T$=shutter thickness. The equation of general pill motion is given by:

$$x=v_ot+(½)\alpha t^2$$

where x=the distance the pill will drop, $v_o$=the initial pill velocity, $\alpha$=gravitational acceleration, t=total pill drop time. Because the pill starts from a rest position, $v_o$=0. The total distance the pill will drop is equal to D, which equals $P_T+S_T$. Solving for t yields $$t=\sqrt{2(P_T+S_T)/\alpha} \qquad \text{Equation 1}$$

SAMPLE CALCULATION: $S_T$=0.08" and $P_T$=0.170" for aspirin and 0.26" for a typical vitamin. The calculated drop time is t=0.025 seconds for aspirin and t=0.042 sec for the vitamin.

Figure 12B:
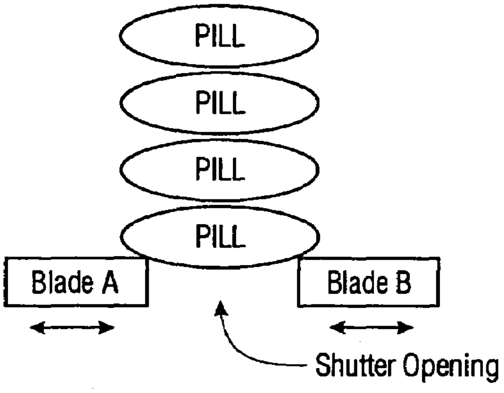
FIG. 12B diagrammatically illustrates the required position and orientation of pills in the reservoir to achieve the maximum theoretical singulation rate.

The sample calculations above show that if pills were perfectly lined up (See FIG. 12B) to drop through the shutter opening, they could drop at the rate of 1/0.025 sec=40 pills/sec for aspirin and 1/0.042 sec=23.8 pills/sec for the vitamin.

When the present invention is used to singulate pills, the theoretical maximum rate is reduced by the introduction of the probabilistic variables pill orientation and friction. Those variables have a negative impact on the throughput of the system which can be compensated for by adding the separation device 24 discussed above with FIG. 4. If pills are not perfectly lined up to fall through the shutter opening, in the absence of a separation device such as 24 illustrated in FIG. 4 to provide proper orientation, the pills must rely on gravity, blade friction, blade geometry, and other blade features such as, but not limited to, ridges, bumps, angles and curvatures to help move the pills into the proper position and orientation over the shutter opening. The ability of the blades to agitate the pills and move them into position over the shutter opening is lost for shutter speeds where friction is no longer effective.

Tests were performed using smooth surface blades made out of aluminum. The ability of the blades to agitate the pills and move them into position over the shutter opening was lost for shutter speeds exceeding 5 cycles per second because of the loss of frictional forces. The blade surface could be modified as discussed above to enable higher blade rates, but then care must be taken not to make the frictional forces so high that pill dust is created.

As stated, blade friction is required to properly position and orient the pill over the shutter opening in the absence of separation device 24. However, it is not possible to insure that each and every shutter cycle will result in a pill finding the correct pill position and orientation to fall through the opening. There are several reasons for this. Several pills may be fighting each other to move over the opening. A pill may move into the correct position and not the proper orientation or vise-versa. The chamber 64 may be starved for pills and a new pill is not available for the shutter to move into place. The chamber 64 may be over-filled and the inter-pill forces are locking the pills in place and making it much more difficult to move and orient a pill over the opening.

Assume that because of all of the above-mentioned problems, the lower blades are able to properly position and orient pills over the shutter opening only once every other shutter cycle. Also assume that the ability of the lower blades to agitate pills is lost for cycle rates above five cycles per second because of the loss of frictional forces. That will then yield a maximum pill singulation rate of 2.5 pills per second. Experimental data actually measured five to ten second bursts of pill singulation that approached an average of 3 pills per second. For larger numbers of pills in the chamber 64, the measured singulation rates fell to 1 pill per second. That was believed to be due to the chamber 64 tending to overfill, making it more difficult for the lower blades to move individual pills into the proper position and orientation over the shutter opening.

Figure 13A:
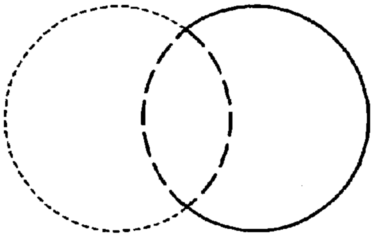
FIG. 13A illustrates the intersection of two blade openings.
Figure 13B:
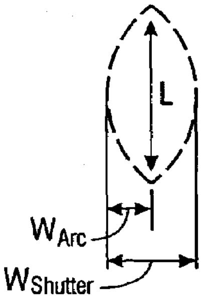
FIG. 13B illustrates the dimensions of the resulting shutter opening.
Figure 13C:
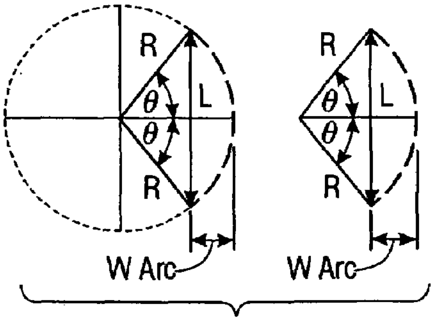
FIG. 13C illustrates the trigonometric relationships within the shutter opening.

Referring to FIGS. 13A, 13B and 13C, a relationship can be developed that relates the width and length of the shutter opening for any size opening. This relationship is useful when determining the minimum and maximum opening size that should be used for a given pill geometry because either the width or length can be the limiting factor in whether a pill can drop through the opening. The required maximum and minimum blade size affects the feed rate as the shutter must alternate between these two rates at a cyclic rate that is slow enough to enable pill agitation.

FIGS. 13A, 13B and 13C can be used to help develop a relationship between the shutter opening length (L) and the shutter opening width ($W_{SHUTTER}$). The first step is to develop a relationship between $\theta$ and $W_{SHUTTER}$. FIG. 13 shows that the following trigonometric relationship exists:

$$\text{Cos } \theta=(R-W_{ARC})/R$$

where R is the radius of the shutter opening. Assume R=½". Making this substitution and solving for $W_{ARC}$ and then $W_{SHUTTER}$ yields:

$$\cos\theta=(R-W_{ARC})/R=(½-W_{ARC})/(½)$$

$$W_{ARC}=(1-\cos\theta)/2$$

$$W_{SHUTTER}=2W_{ARC}=2[(1-\cos\theta)/2]=1-\cos\theta$$

$$W_{SHUTTER}=1-\cos\theta \qquad \text{Equation 2}$$

For reasons that will be seen later, it is advantageous to isolate Cos θ. Therefore, $$\cos\theta=1-W_{SHUTTER} \qquad \text{Equation 3}$$

Similarly, it is also possible to develop a relationship between θ and L $$\sin\theta=L/(2R) \text{ where } R=½''$$

$$\sin\theta=L$$

Squaring both sides of equations 2 and 3 yields:

$$\cos\theta=1-W_{SHUTTER}\rightarrow\cos^2\theta=(1-W_{SHUTTER})^2$$

$$\sin\theta=H\rightarrow\sin^2\theta=L^2$$

Adding both equations to each other yields $$\cos^2\theta+\sin^2\theta=(1-W_{SHUTTER})^2+L^2$$

Applying the trigonometric identity $\cos^2\theta+\sin^2\theta=1$ yields $$1=(1-W_{SHUTTER})^2+L^2$$

Solving for L yields $$L=\sqrt{2(W_{SHUTTER})-(W_{SHUTTER})^2} \qquad \text{Equation 4}$$

This relationship can be used to relate the width and height of the shutter opening for any size opening.

Figure 14B:
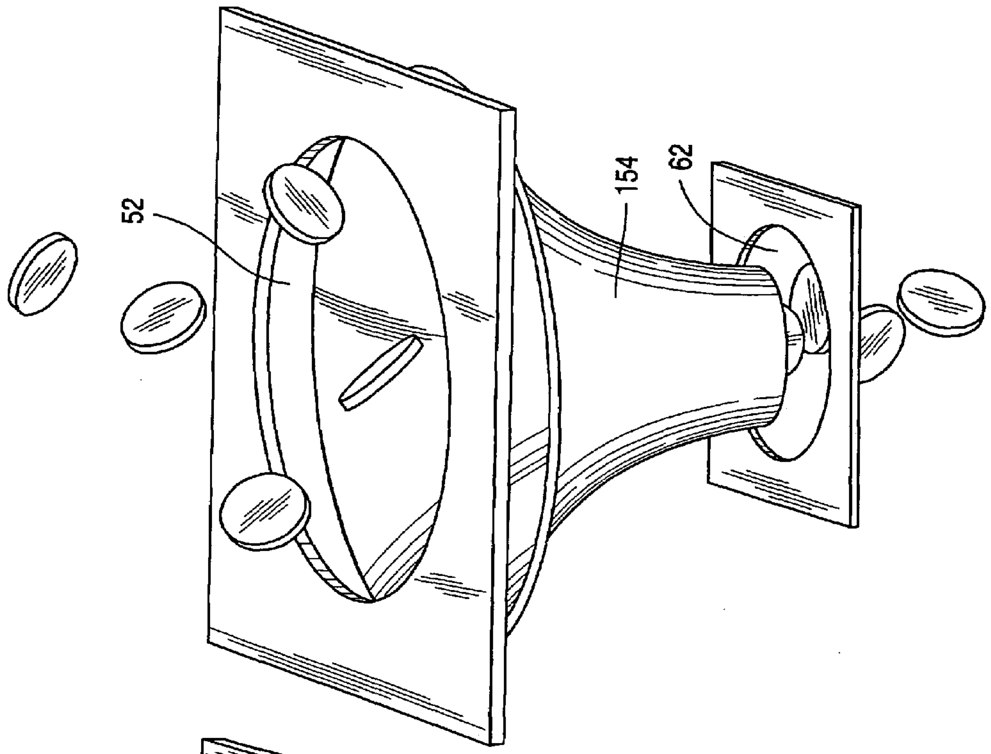
FIGS. 14A through 14C illustrate examples of separation devices located between the entry aperture and the exit aperture.
Figure 14A:
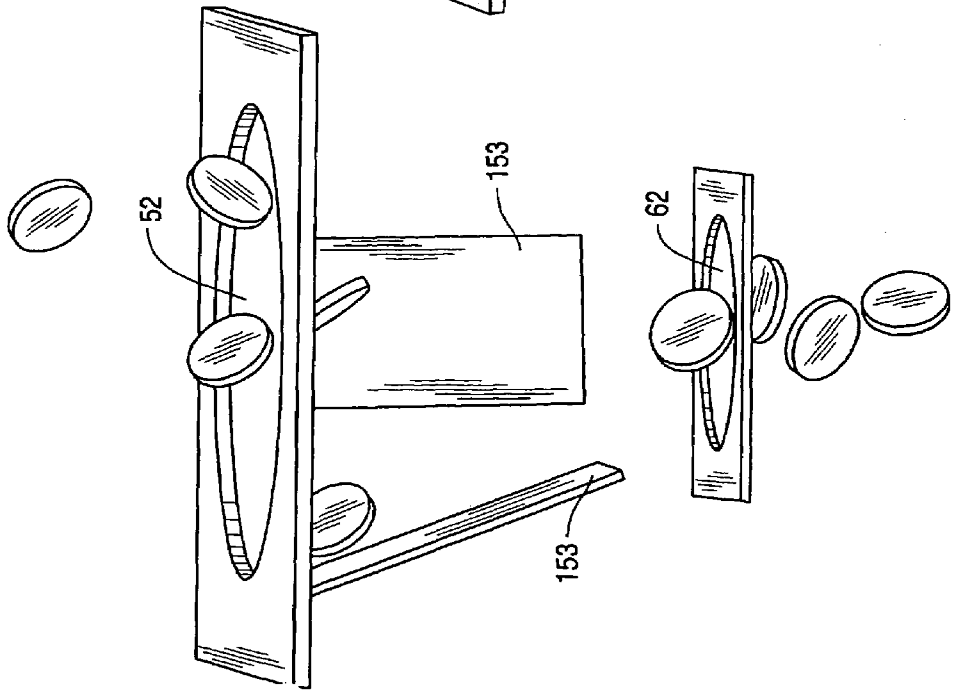
Figure 14C:
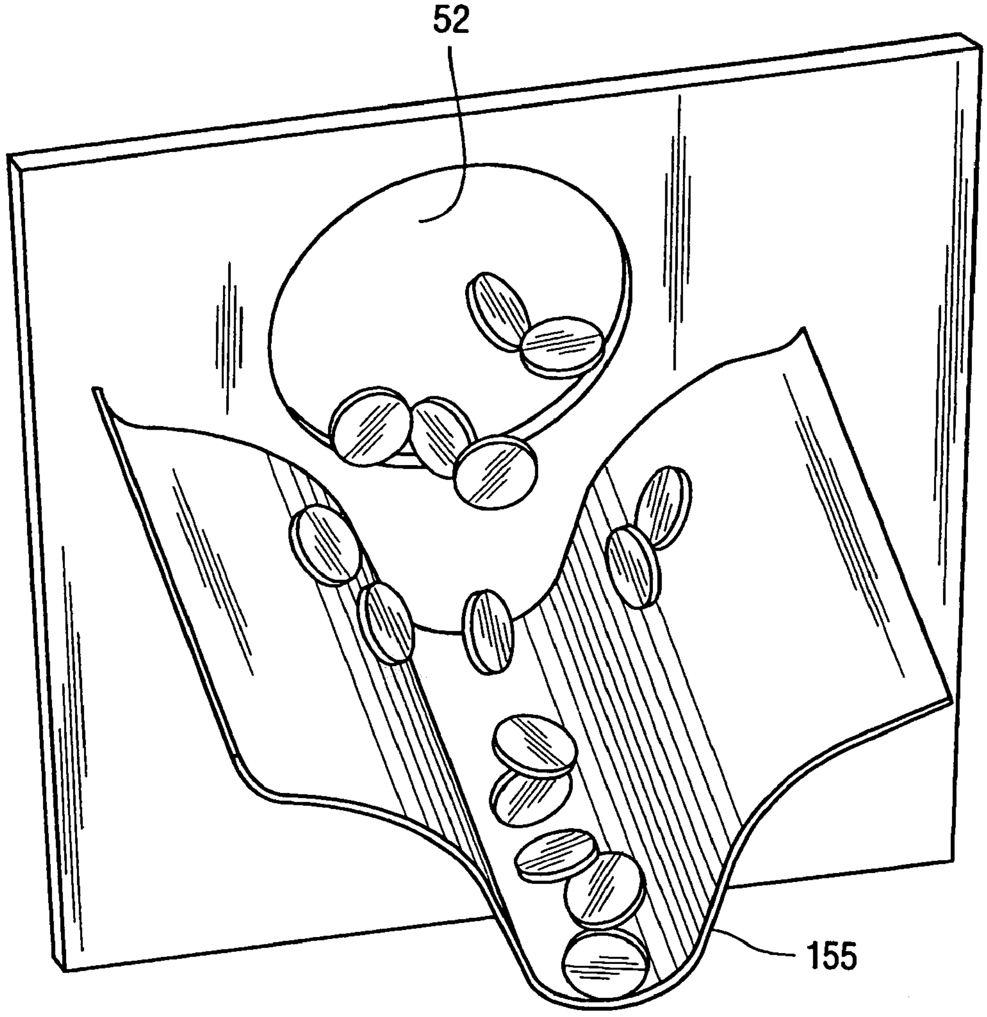

FIGS. 14A through 14C illustrate examples of separation devices 24 for performing a separation process between the entry aperture 52 and the exit aperture 62. In FIG. 14A, a pair of guides 153 is provided. The guides slope downward, and are angled inward to reduce the random motion of pills and to present the pills in the proper orientation for discharge from exit aperture 62. Similarly, in FIG. 14B a funnel 154 is provided. In FIG. 14C, a slide 155 is provided to begin the singulation process. The slope of the center of the guide is greater than the slope along the sides of the guide thereby encouraging the pills into the bottom of the guide in a single file manner. The steeper slope of the center of the guide will accelerate pills faster than the more gradual slope further from the center. Should the guides 153 in FIG. 14A, funnel 154 in FIG. 14B or the slide 155 in FIG. 14C be sufficiently long, the pills may be sufficiently well oriented at the bottom thereof for presentation to a fragment detection sensor. These embodiments take pills entering chamber 64 and reliably place them into a known orientation and position in a way that increases singulation throughput of the lower shutter. These embodiments do not rely on blade agitation and random pill movement to reach the proper pill orientation and position. Therefore, it should be possible to achieve singulation rates significantly above the 3 pills per second that were experimentally achieved without using such separation devices 24.

Figure 15:
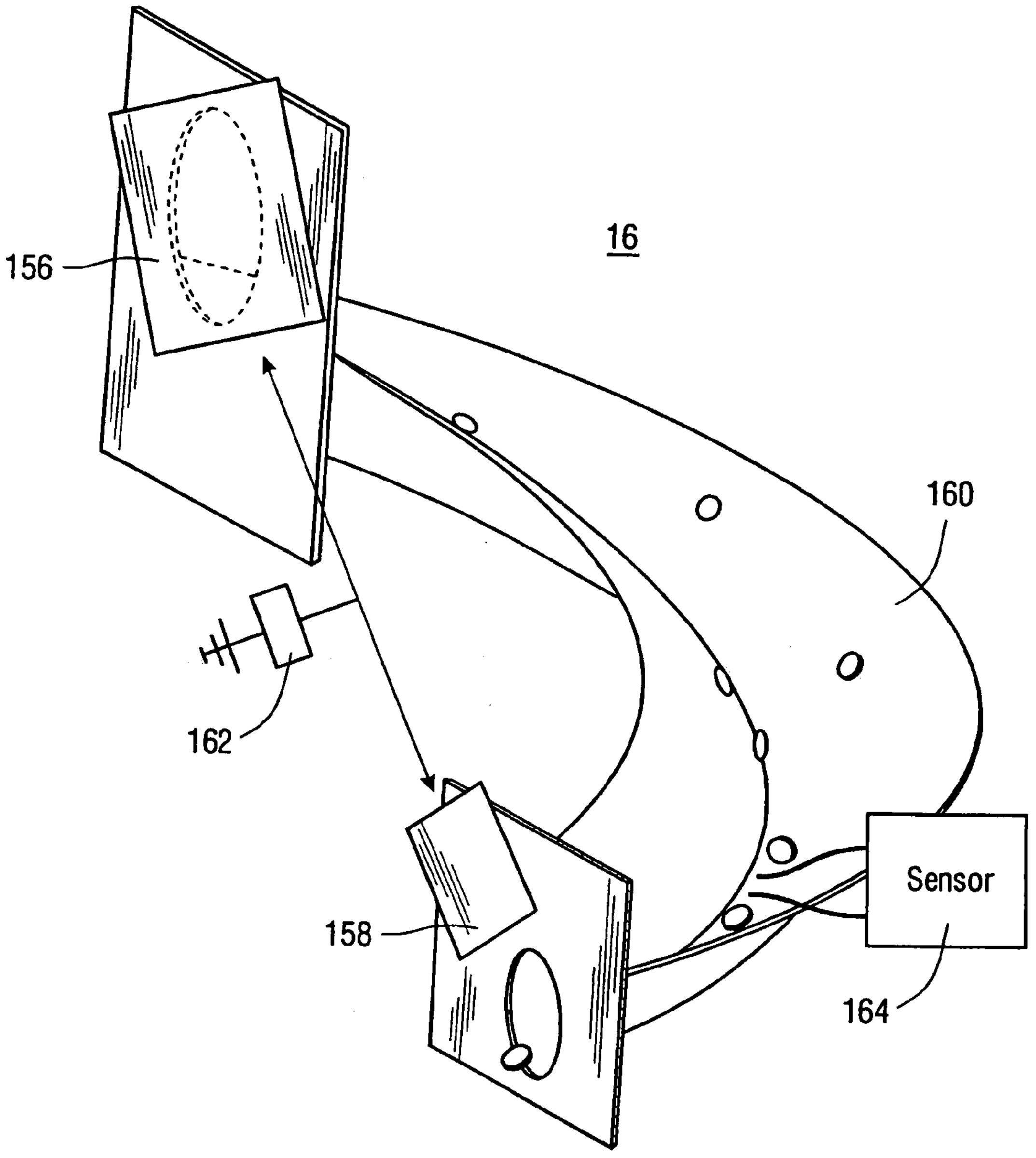
FIG. 15 illustrates another embodiment of a flow control device having a separation device.

FIG. 15 illustrates another embodiment for the internals of a flow control device 16. In FIG. 15, the upper metering device is provided by a guillotine valve 156 while the lower shutter is replaced with a lower guillotine valve 158. A slide 160 connects the upper guillotine valve 156 to the lower guillotine valve 158. With both guillotine valves 156, 158 vertically mounted, one actuator 162 can be used to drive both valves. The actuator can be a linear actuator with cams, a slider and crank assembly or a slider/slider mechanism to enable the two valves to operate at different rates. If the slide 160 is sufficiently long, pills may be sufficiently well singulated for presentation to a fragment detection sensor before being emitted by guillotine valve 158. It is preferable that at least the lower guillotine valve 158 be soft or flexible to minimize chopping of the pills. Bumps on the exterior of the guillotine valve 156 will help agitate the pills in the bulk storage device and prevent bridging.

In the embodiment of FIG. 15, a sensor 164 is shown, although such a sensor may be provided with any of the embodiments. The sensor may produce signals which may be used to count articles passing through guillotine valve 156, verify the identity of articles to ensure that the proper articles are being dispensed, identify the orientation of articles and the condition of articles (e.g., fragments). When the sensor 164 is used to count articles, that signal may be used as active feedback to control the guillotine valve 156 and thereby help smooth the flow into chamber 64. The exact positioning of the sensor is not critical to the present invention. Additionally, it is anticipated that more than one sensor may be provided, and the position need not be limited to a position inside device 16.

When the sensor 164 is used to provide active feedback, the sensor 164 counts the number of items that fall into the chamber 64 every time the guillotine valve 156 opens and closes. The number of items dispensed from the flow control device 16 is then determined, either by counting, weighing, or otherwise. By knowing the number of items admitted to chamber 64 and the number of items dispensed from device 16, the guillotine valve 156 can be controlled to optimize the number of items within chamber 64. As previously stated, such feedback may be provided in conjunction with any of the embodiments.

Using active feedback to control the size of the upper aperture, or whether the upper aperture is open or closed, ensures that chamber 64 is not significantly underfilled or overfilled. In the overfilled condition, inter-pill forces can lock the pills into position so that they cannot easily orientate themselves over the exit aperture. In the underfilled condition, the exit aperture is starved for pills such that throughput would increase if the average number of pills in chamber 64 increased.

In a similar fashion, controlling the size and whether the exit aperture is open or closed based on the number of items in the chamber 64 better facilitates either bulk flow or singulation.

Tests have shown that this embodiment increases throughput and provides more uniform flow over time when compared to devices that did not employ active feedback. The singulation speed of this embodiment is similar to several products currently on the market. Unlike those products, however, this invention has the ability to also perform bulk flow and dispense a wide range of pill geometries.

Figure 16:
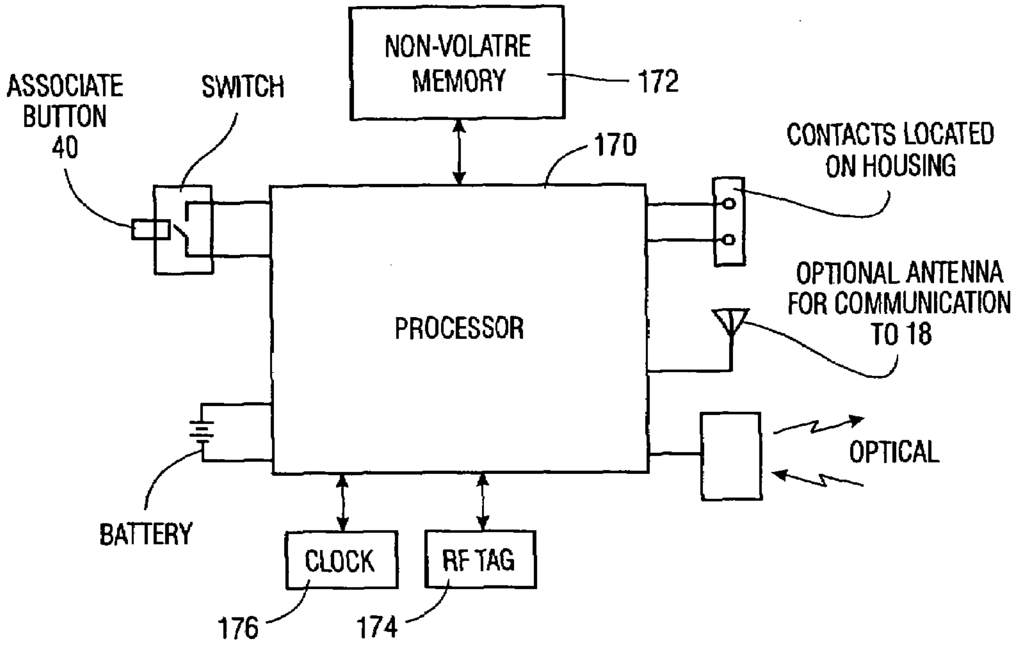
FIG. 16 is a block diagram of a portion of the electronics carried by the flow control device.
Figure 17:
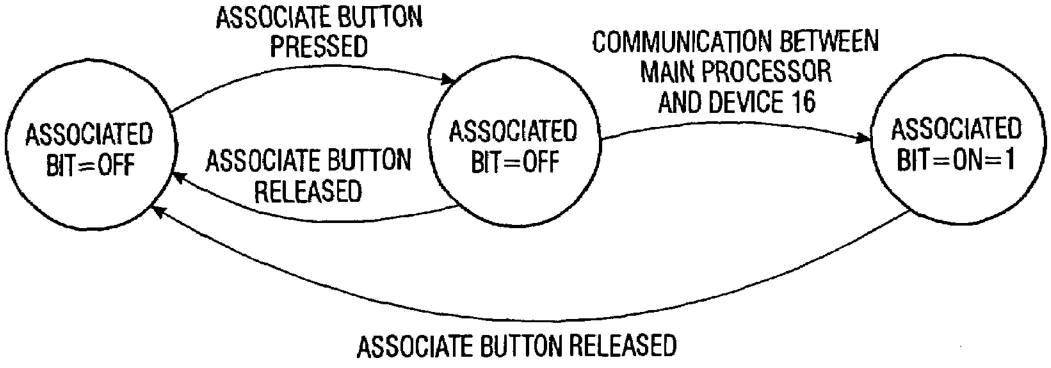
FIG. 17 is a state diagram illustrating the states associated with the association bit.

In a preferred embodiment of the present invention, as shown in FIG. 16, the device 16 carries a processor 170 and a memory device 172 for storing information. The information can include a bit set to a first state when the article storage container 12 is connected to the device 16 and set to a second state when the article storage container 12 is detached from the device 16. The state of the bit can be responsive to the state of the switch 40. For example, if the bit is set to "1" when the article storage container 12 is connected to the device 16 and the switch 40 is in a depressed (logic 1) state, and if the switch 40 assumes its non-depressed (logic 0) state because the article storage container 16 was disconnected from device 16, then the bit may be reset to "0". If the article storage container 12 is reattached to device 16, the bit may stay at logic "0". See FIG. 17. Thereafter, if the device 16 is inserted into the article counting and actuating station 18, the station 18 may interrogate the device 16. Upon discovering that the bit is set to a logic "0", the system 10 may be rendered inoperative to prevent a dispensing event from occurring. Thus, the information stored in the memory device can include information on the continuity of the connection between a specific device 16 with a specific article storage container 12. Additionally, or in the alternative, the information can include information about the flow control device 16 (e.g. number of dispensing events before cleaning is required, in service date, location, etc.), information about the articles in associated container 12 (lot number, expiration date, etc.), or dispensing information (date dispensed, number of items dispensed, etc.) from which an audit trial may be created, inventory records maintained, patient billing updated, etc.

One embodiment for the RF tag 174 uses devices with predefined and unique values. An example of an RF tag 174 with a predefined 64-bit value is available from Texas Instruments as part number RI-TRK-R9WK or RI-TRP-RRHP. The 64-bit values are randomly assigned to each RF tag by the manufacturer when produced thus allowing for approximately $1.84\times10^{19}$ different data values, making it highly unlikely that any two devices 16 would be assigned the same RF tag value.

Another embodiment for the RF tag 174 uses devices which allow the customer to program or write a unique 64-bit value into the device. If the present invention were to use these customer programmable RF tags, the system would maintain a list of RF tag values used within the pharmacy to insure no two devices 16 have the same RF tag value. The system would continue to assign unique values, insuring never to re-use the same value again.

RF tags 174 will eventually be available with additional memory storage capability. The system may utilize the additional storage memory to record pertinent information specific to the device 16 or the contents of the associated container 12. This information may be static information representing the drug information (name, strength, manufacturer, distributor, etc.), drug specific information (lot number, expiration date, bottle opened on mm/dd/yy, bottle opened by XXX, etc.) dynamic information (number of prescriptions filled, original medicine bottle quantity, quantity remaining, etc.), or user information (last used by XXX). When using RF tags 174 with additional memory storage, the information would be read or written via an RF reader (not shown). The system would maintain the bar code or RF indicia for each device 16 in a database. The database would record each prescription filled by a worker and the contents of each associated container 12 by the associated device 16.

As shown in FIG. 16, the device 16 may carry a clock circuit 176. With internal clock circuit 176, time functions, such as expiration date of lots, average time to fill a script, and maximum time a stock bottle is off its shelf, can be added to the system. When clock circuit 176 is provided, it may be desirable to add a display (not shown) to device 16. Additionally, a local GPS (not shown) and/or an addressable circuit together with a speaker, light, or other type of annunciator may be provided on device 16 to facilitate easy location of the desired device 16 from a plurality of such devices.

Figure 18:
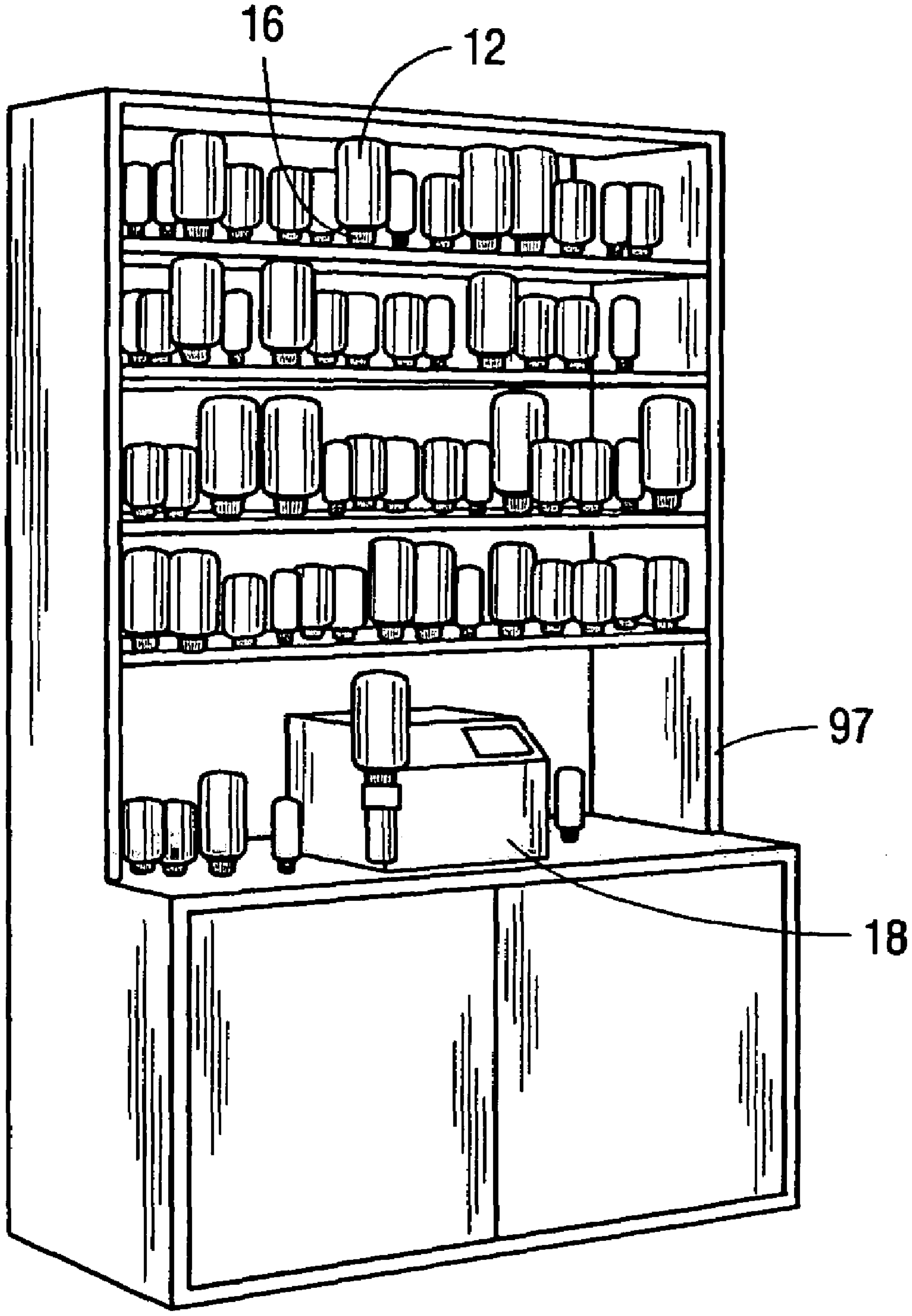
FIG. 18 illustrates the system shown in FIG. 1 used in a workstation where numerous dispensing systems are stored until they are needed for a dispensing operation.

FIG. 18 illustrates a work station 97 in which the system 10 of the present invention may be employed in, for example, a pharmacy application. In FIG. 18, an article counter and actuating station 18 is illustrated. Also illustrated is a plurality of article containers 12, in this case stock bottles, each one associated with its own device 16. The "association" process is described below in conjunction with FIGS. 20 and 21. As seen in FIG. 18, a plurality of stock bottles of different sizes may be provided, each having its own device 16, employing adapters 14 as needed. The work station 97 illustrated in FIG. 18 allows for a dense storage of pharmaceuticals in a scalable manner. When filling prescriptions, the stock bottle containing the desired medication is pulled from the shelf and placed in the station 18. Although methods of operation are described below, the general process flow and data flow are illustrated in FIG. 18A.

Figure 18A:
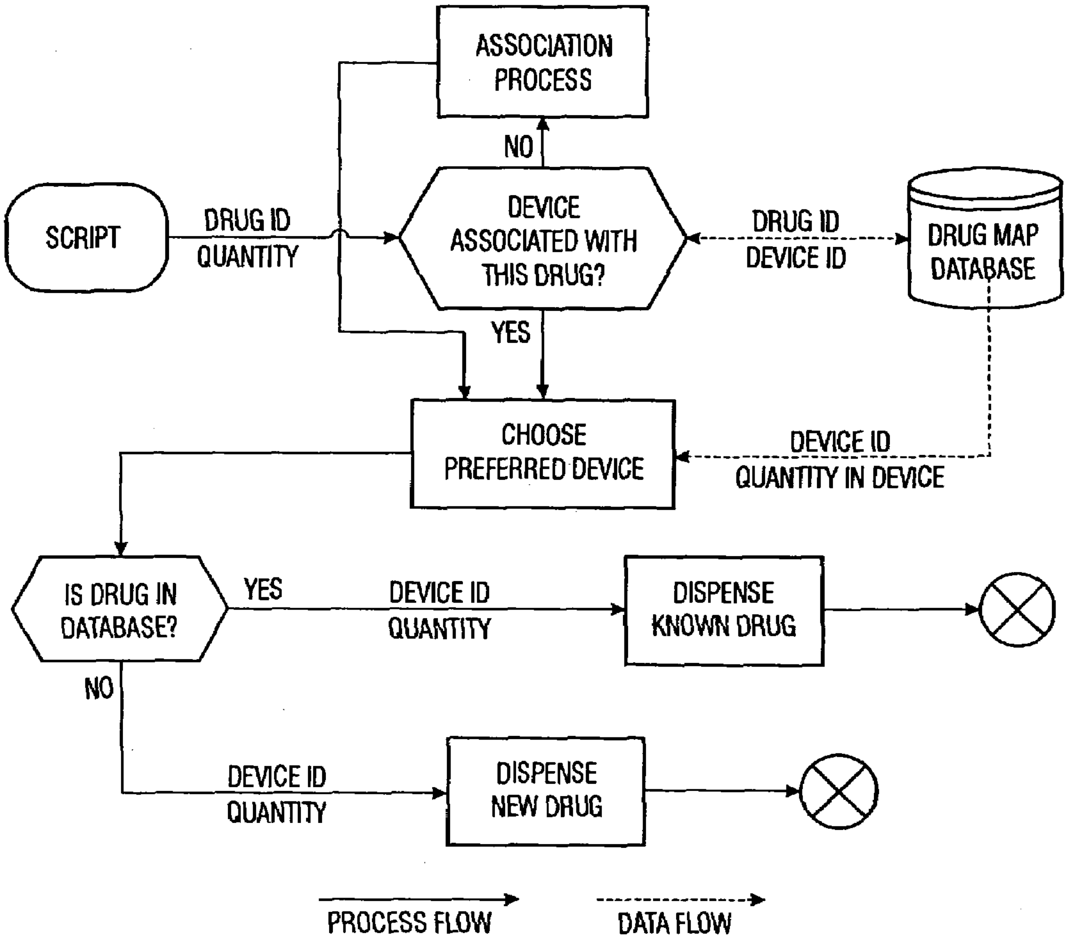
FIG. 18A illustrates the process flow and data flow when using the workstation of FIG. 18.
Figure 20:
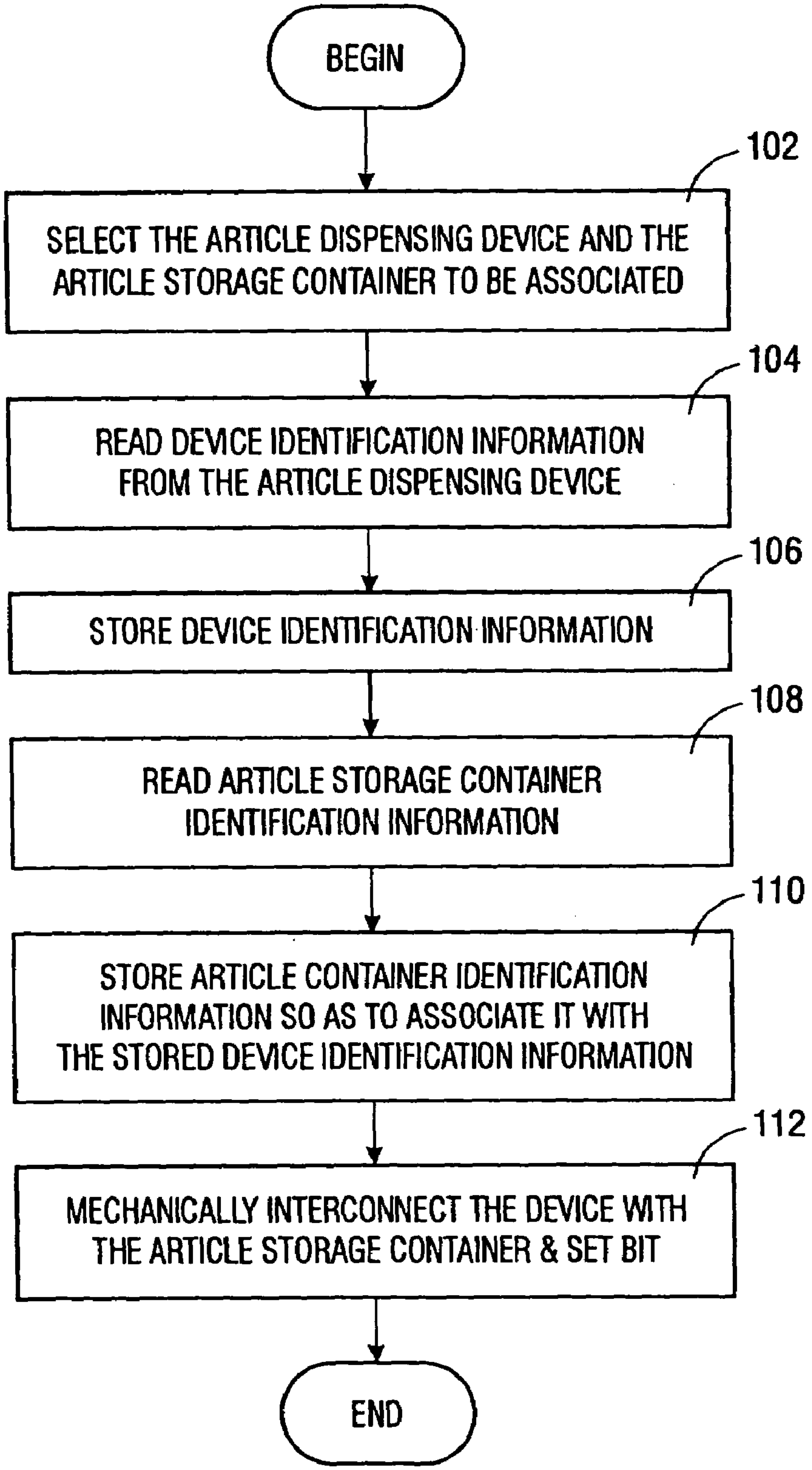
FIG. 20 illustrates a method of associating a flow control device with an article storage container.
Figure 21:
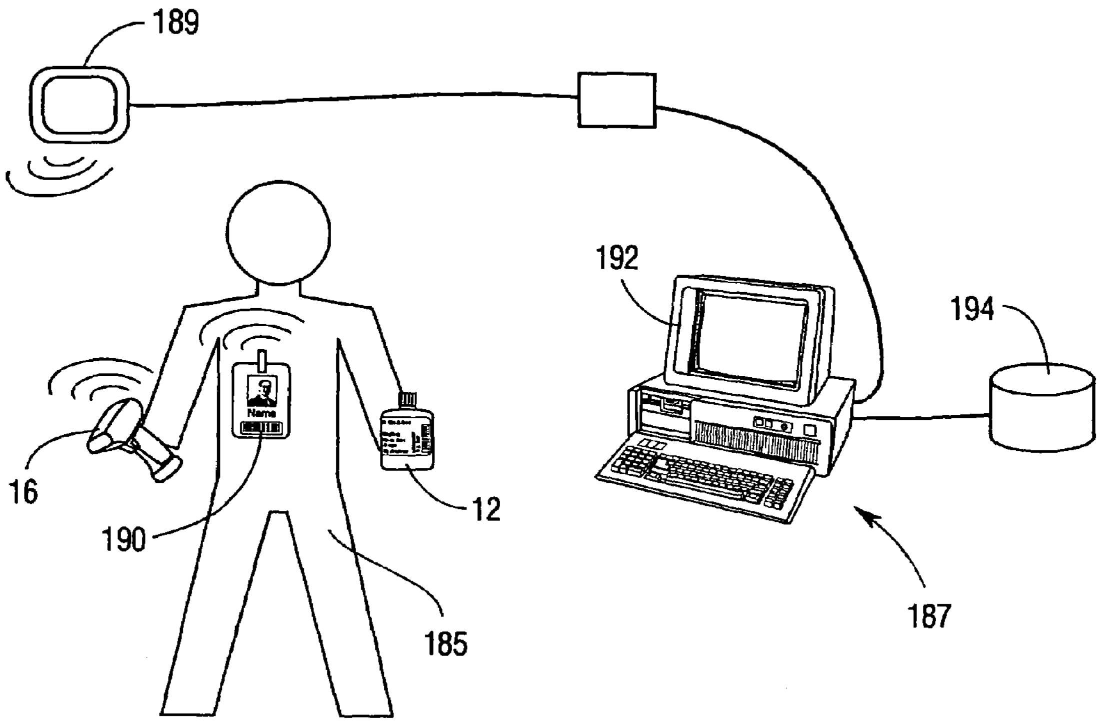
FIG. 21 illustrates another method of associating a flow control device with an article storage container.

FIG. 18A illustrates the process flow and data flow when using the work station 97 of FIG. 18. When a prescription is received, a determination is made if a flow control device 16 is associated with the drug identified in the prescription. If not, an association process, as will be described below in conjunction with FIGS. 20 and 21 is performed. If yes, the preferred stock bottle 12 and associated flow control device 16 are selected. If the drug is in the data base, the known drug is dispensed. If not, a new drug may be dispensed. Although it is preferred that any new drug be input to the data base, and associated with a flow control device, before being dispensed so as to obtain the full benefits of the present invention, it is possible to allow drugs to be manually dispensed without being in the data base or associated with a flow control device.

Figure 19:
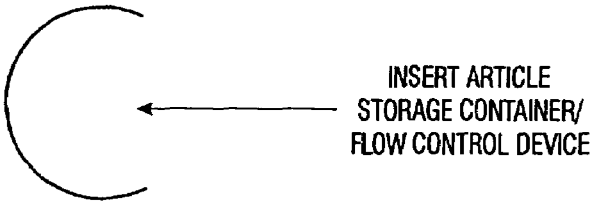
FIG. 19 illustrates a connector which may be used to connect the article storage container/flow control device combination to the wall or shelf of the workstation.

FIG. 19 illustrates one example of a connector that may be used to hold the stock bottles in place on the shelves of the work station 97 until they are needed for a dispensing event. Those of ordinary skill in the art will recognize that many other types of connectors may be used.

In FIG. 20, a method of associating a flow control device 16 with an article storage container 12 is illustrated. At step 102, the article storage container and the device to be associated are selected. At step 104, information identifying the device 16, e.g. an identification number, is read from a memory carried by the flow control device, or otherwise input. That information is stored at step 106. Optionally, a user identification may also be stored.

Information identifying the storage container 12 is read, scanned, or otherwise entered at step 108. The information identifying the article storage container 12 is stored at step 110 in a manner so that it is linked to (i.e. associated with) the information identifying the flow control device 16. At step 112, the article storage container is mechanically interconnected to the device, with or without an adapter, so as to depress the switch 40. A bit in the memory 172 carried by the device 16 may be set so as to correspond to the depressed position of the switch 40. In that manner, an article storage container 12, such as a stock bottle, is associated or tied to a unique device 16. Those of ordinary skill in the art will recognize that the reading steps 104 and 108 may be performed in any desired order and the storage steps 106 and 110 may be performed at any convenient time such that the order of the steps in FIG. 20 is not critical.

Referring now to FIG. 21, the process for associating a flow control device 16 to a new stock bottle 12 may be performed by a worker 185 in a manner driven by a computer system 187. Once the worker 185 has initiated the association process, the computer system 187 will determine the worker's identification by using an RF reader 189 to scan the worker's RF identification badge 190. Alternatively, a bar code scanner could be used to read a bar code on identification badge 190, or any other type of identification scheme may be used to uniquely identify the worker 185. Using the same RF reader 189, or other appropriate input device, the device 16 is identified by reading the value transmitted by its RF tag 174. The computer system 187 then directs the worker 185 throughout the process using various instructions displayed on the computer system monitor 192. The worker 185 may be directed to retrieve a stock bottle 12 from stock shelves located within the pharmacy.

After retrieving the stock bottle 12, the worker 185 is instructed to scan the stock bottle bar code using the bar code reader, or to manually enter identifying information if no bar code is available. When the stock bottle information is input, the computer system 187 compares this input information to corresponding information stored in a database 194 to insure the correct drug is associated with the flow control device 16.

If the drug is not presently associated with the flow control device 16, the worker 185 is informed via the monitor 192 or via any suitable output device such as an audible alert. The worker 185 may override this warning by indicating to the computer system 187 that the device 16 is now being associated with the drug contained in stock bottle 12. The computer system 187 may require the worker 185 to enter various drug specific information (drug number, name, strength, manufacturer, distributor, among others) and stock bottle information (lot number, expiration date, among others) as previously described. This information is stored in the computer system database 194 for future reference and use.

If the correct drug is associated with the flow control device, the computer system 187 may retrieve stock bottle 12 quantity information from the database 194 by looking up the stock bottle bar code and retrieving the quantity contained in each stock bottle when received from the manufacturer.

The computer system 187 may provide the worker 185 the opportunity to resolve inventory inaccuracies between the information stored in the computer system database 194 and actual inventory in the stock bottle resulting from, for example, the return of stock to inventory, more or less pills being dispensed than were counted, etc. by manually adding to or subtracting from the count stored in the computer. This allows the computer system 187 and database 194 to monitor and manage the inventory levels of each drug and stock bottle located within the pharmacy. By using the bar code or RF tag 174 and computer system 187 and database 194, the worker 185 is further insured that correct medicament is used to fill the patient's prescriptions by the computer system 187 and database 194 verifying that the associated stock bottle and pills correspond to the prescription.

Figure 21A:
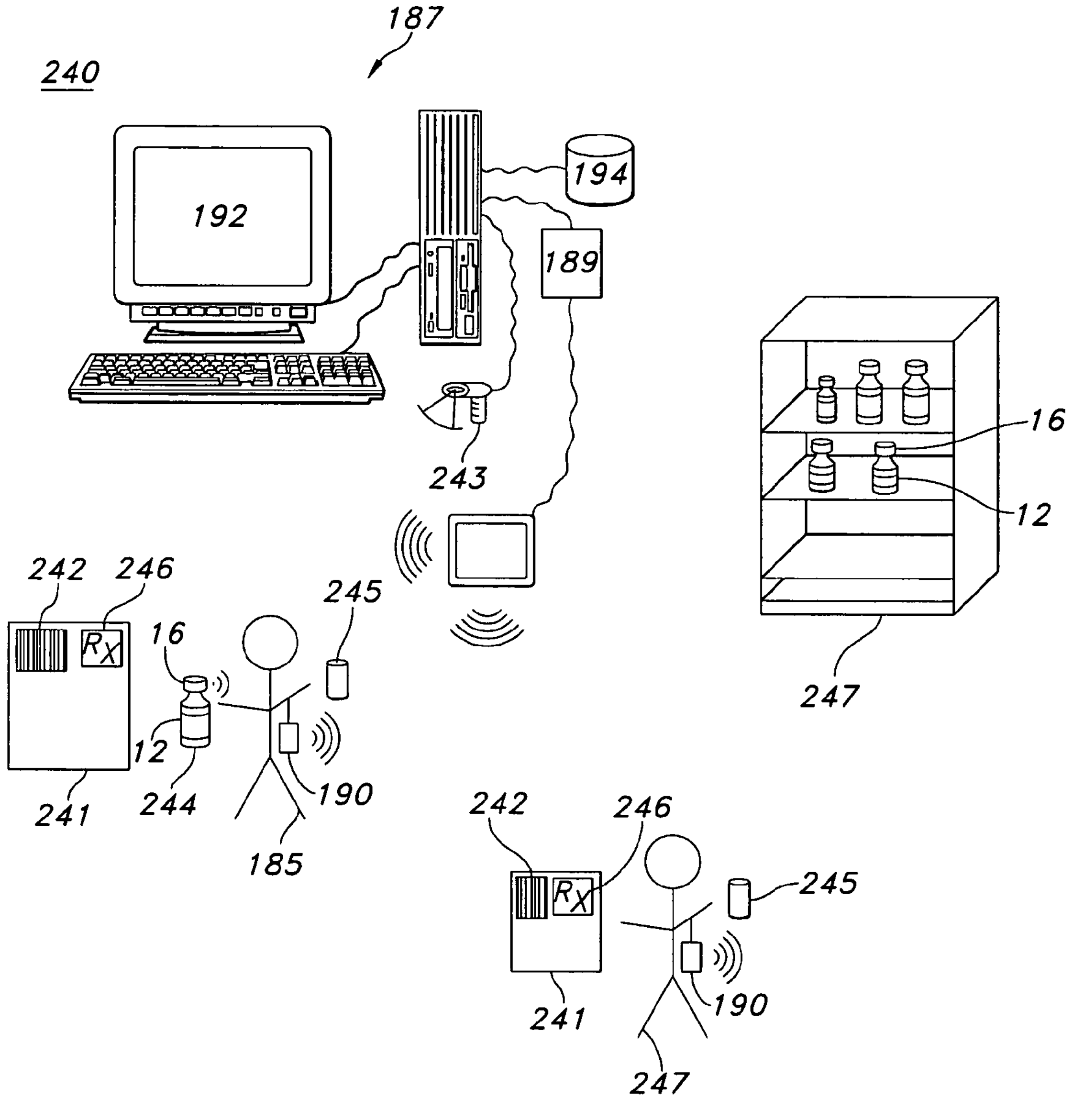
FIG. 21A is a diagram of the system used to fill and verify a patient's prescription.

Referring now to the system shown in FIG. 21A, one example of a process 240 for filling a patient prescription 246 using device 16 by the worker 185 on the computer system 187 is illustrated. The worker 185 may initiate the patient prescription filling process 240 on the computer system 187 by scanning a bar code 242 on a prescription label sheet 241 using a bar code reader 243. The computer system 187 will determine the worker's identification by using the RF reader 189 to scan the worker's RF identification tag 190. The worker 185 may be directed to retrieve a stock bottle 12 associated with device 16 from stock shelves located within the pharmacy 247.

The computer system 187 will monitor the RF reader 189 to detect the return of the worker 185 by reading the worker's RF identification tag 190. The computer system 187 will read the RF identification tag 174 from the device 16 with an attached stock bottle 12 for medicament 244. The worker 185 will be directed through the proper steps in correctly filling the patient prescription. The computer system 187 directs the worker 185 throughout the process using instructions displayed on the computer system monitor 192.

The computer system 187 will locate the RF identification tag 174 in the database 194 and retrieve the associated medicament information. The computer system 187 confirms the correct medicament 244 is used to fill the vial 245 for the patient prescription 246. If the incorrect device 16 is being used, a visual and audible alert is provided to the worker 185. The worker 185 must acknowledge the potential error before proceeding.

Each prescription 246 filled by the computer system 187 will have recorded several pieces of information in the database 194 for future use by the pharmacist 247. Each prescription 246 filled will include the worker identification via the associated worker RF identification tag 190, medicament 244 and medicament specifics via the association to a device RF 174 or bar code indicia. The prescription filling records can be used by the pharmacist 247 for various purposes by generating reports available within the computer system 187.

When the worker 185 has completed filling the patient prescription 246, the inventory level for the device 16 is adjusted in the database 194 by the computer system 187. The inventory levels and reports can be used by the pharmacist 247 for reordering purposes.

Figure 22:
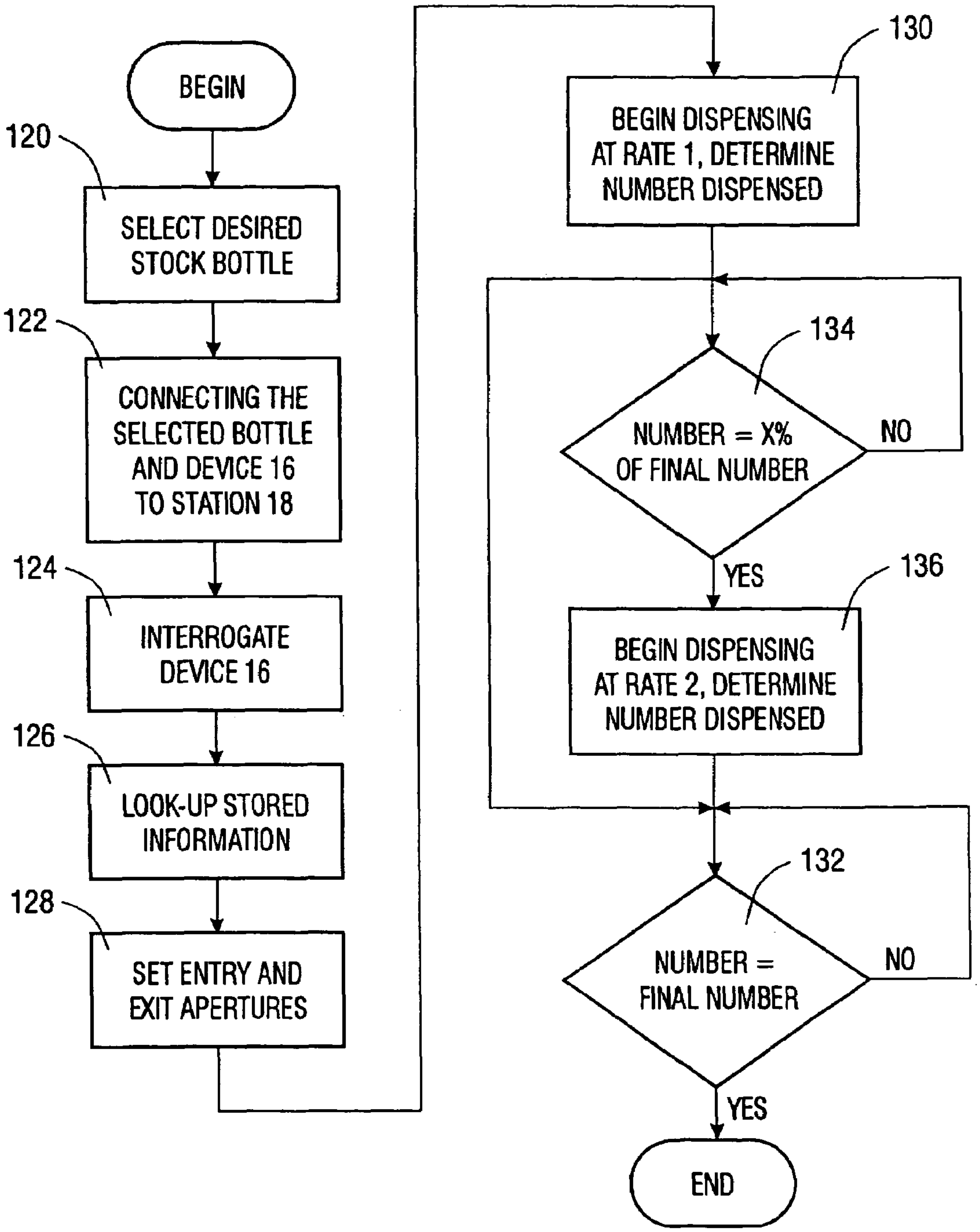
FIG. 22 illustrates a method of operating the system of FIG. 1.

Turning now to FIG. 22, a method of using the station 18 in connection with the pharmacy work station 97 is described. Beginning with a prescription to be filled, at step 120, the worker may be directed to the location of the device and associated stock bottle by any of the methods previously discussed. The worker selects the desired stock bottle which contains the medication necessary for filling the prescription. At step 122, the stock bottle and its associated device 16 are connected to the station 18. At step 124, the station 18 interrogates device 16. In the preferred embodiment, the interrogation is automatically performed electronically. For example, the station 18 may be provided with electronics for interrogating the memory device 172 carried by the device 16 to ascertain, for example, the device's identification number and the status of the bit representative of the switch 40. If the bit representative of the status of the switch 40 indicates that the stock bottle has been removed from the device 16, a message may be provided to the user and the dispensing event prohibited until the discrepancy is resolved. Assuming that the status bit does not indicate removal of the stock bottle from the device 16, the information identifying the device 16 may be used to look up the stored information about the drug in the stock bottle. That information may be displayed to the user or, if the user has input the desired drug, compared to the input information to ascertain that the right stock bottle has been selected. Assuming that all the information retrieved at step 126 as a result of interrogating the device 16 is correct, i.e. correct medication, correct dosage, etc., additional information (e.g. the size of entry aperture 52 and exit aperture 62) is retrieved at step 126.

At step 128, based on the retrieved information, the sizes of the entry and exit apertures are set and dispensing begins at step 130. The dispensing begins at a first flow rate and as the dispensed items fall through the counting zone 28, they are counted. At step 132, the current count is compared to a final count, and if the correct number of articles has been dispensed, the process ends. If the correct number of articles has not yet been dispensed, the dispensing process continues until the current count equals the final count.

The counting may be performed in a variety of ways. For example, a camera may be used to create an image of the falling item. The image produced by the camera may be examined to not only count the items, but to judge relative quality, such as whether the item is a pill fragment. The counting and quality assessment may be accomplished by connecting the camera to a personal computer to process the image data. Alternatively, non-PC based vision systems could also be used.

According to another embodiment, a retro-reflective sensor may be used. The sensor is used to create a light plane which detects any items that break the light plane. The output of the sensor may be connected to a programmable logic controller (PLC) so that the PLC can count the number of items that break the light plane.

The PLC may also be connected to motors 20, 20' for controlling the flow control device 16. By controlling the flow control device 16, the PLC will know when the exit aperture 62 is open and therefore will know when to expect items falling through the light plane. The information gathered by the PLC may also be used to modify the operation of flow control device 16 to program higher flow rates or better singulation as required. The system may be operated with or without dynamic feedback as discussed above. Those of ordinary skill in the art will recognize that various types of sensors and electronics may be provided to enable a determination to be made regarding the number of items that have been dispensed. As an alternative to counting, weight may be used to determine the number of dispensed items. That is, the weight of the dispensed items may be divided by a piece weight to determine the number of items dispensed. The present invention is not intended to be limited by the specific implementation of the optics and/or electronics used for determining the number of dispensed items.

It may be desirable to dispense at a high rate, i.e. bulk rate, at the beginning of the dispensing process, but then slow down to a lower rate to insure the correct number of items is dispensed. That is accomplished in FIG. 22 by steps 134 and 136. At step 134, the number of pills dispensed is compared to a desired number. For example, the desired number may be 80% or 90% of the final number. When the current number reaches that desired number, the dispensing rate is adjusted at step 136 to a second dispensing rate. Counting, or some other suitable manner of determining the number of pills dispensed, continues. In that manner, a bulk flow rate may be slowed to a rate in which articles are falling one at a time. However, the change in dispensing rates is optional. The entire dispensing event can be at the first rate which could either be a bulk rate or a rate in which articles fall one at a time.

At the end of the dispensing process, the station 18 causes the entry and exit apertures to be closed. After being closed, the stock bottle and device 16 can be disconnected or removed from the station 18. Due to friction, the closed blades cannot be accidentally opened such that the device 16 prevents the exit of articles from the article storage container 12 and prevents contaminants and moisture from entering the article storage container 12. Thus, the present invention can be implemented so as to be compliant with FDA standards.

The operation of the shutters to facilitate singulation will now be described. It is anticipated that the upper pair of shutters or, in the context of FIG. 4, the upper metering device 23, will operate more slowly than the lower pair of shutters. This is because the upper pair of shutters, or upper metering device, needs to break up bridging and, at the same time, insure that the number of pills input to the separation device 24 or the lower shutter is neither too large or too small. The lower shutter needs to operate at the singulation rate and, if no separation device 24 is provided, must provide agitation to properly position the pill over the exit aperture.

Initially, the device 16 needs to be calibrated so that the electronics controlling the system has a reference position for the blades such that all motion can be made relative to the reference position. For purposes of completeness, we now describe a calibration routine for a device not having sensors, encoders or the like for sensing the position of the blades. Those of ordinary skill in the art will recognize that by providing a device that provides blade location information, the calibration routine to be described can be simplified and automated.

Figure 25:
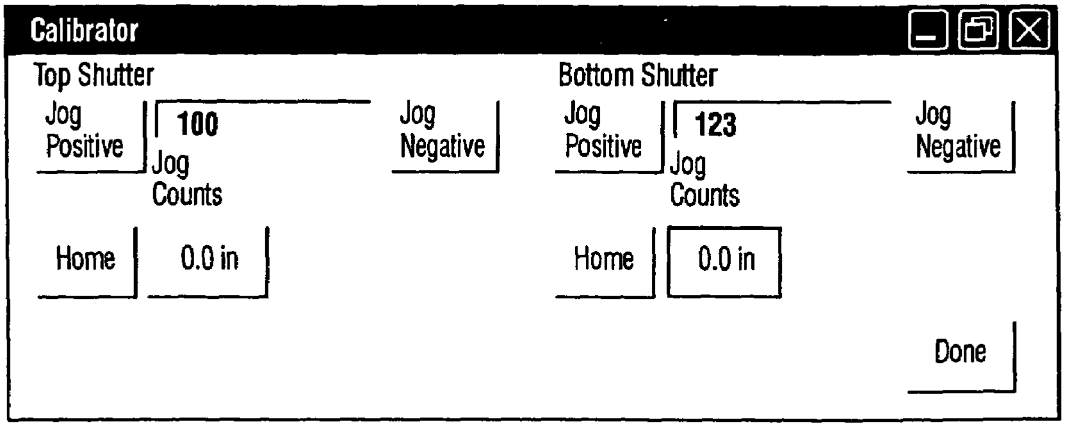
FIG. 25 illustrates an input screen for identifying parameters for a calibration routine.

To calibrate the device, the blades are driven to a hard stop position, which is a position where further blade motion in one direction is no longer possible. The hard stop position can be detected by, for example, monitoring the motors moving the blades to determine when they stall. Using the GUI illustrated in FIG. 25, the motors are then jogged a number of counts until the blades are just barely about to allow the shutter opening to open as determined by visual examination. That blade position may be defined as a "home" position and corresponds to an aperture opening of zero inches.

Controlling of the entry and exit apertures as well as the profile of the duty cycle may be illustrated via a position versus time profile as shown in FIG. 23A for a pair of blades. The blades are first driven to a hard stop position in which the motors stall as a result of the blades being unable to move. From the hard stop position, the blades are moved to their known home position. From the home position, at time to, the blade positions are set so that the shutter opening is set to its minimum opening size, which may be fully closed or, in the case of FIG. 23A, slightly larger than the fully closed position. Thereafter, the shutter opening is varied from the minimum value to its maximum value which may be fully opened or, in the case of FIG. 23A, some value slightly smaller than the fully opened position at time t1. The shutter opening remains at that size until time t2 when the blades are moved back to the position in which the shutter opening is at its minimum opening size. This is followed by a deadtime before the process is repeated at a frequency determined by the drug's characteristics. The fully closed position is preferably not used for singulation to reduce the likelihood of pill fragmenting, chipping or squirting (i.e. being accelerated through the opening by the closing of the shutter opening).

Another profile for a duty cycle is illustrated in the position versus time profile of FIG. 23B. In the position versus time profile of FIG. 23B, it is seen that at time t0 the minimum opening size is such that the shutter opening is fully closed. The blades are then moved such that the shutter opening ramps up to the fully opened position as shown at time t1, followed by ramping downward to the fully closed position at time t2.

As seen from the position versus time profiles of FIG. 23, the following parameters are desirable for controlling the blades and hence the shutter opening:

- size of the opening formed by the shutters, in inches, both minimum and maximum;
- frequency of shutter motion in hertz;
- shape of shutter motion profile in units between 0 and 1 where 0 represents a square profile, 1 represents a triangular profile and the value between 0 and 1 represents a trapezoidal profile. The various parameters used to control the blades are illustrated in the input screen of FIG. 24.

Figures 26A, 26B:
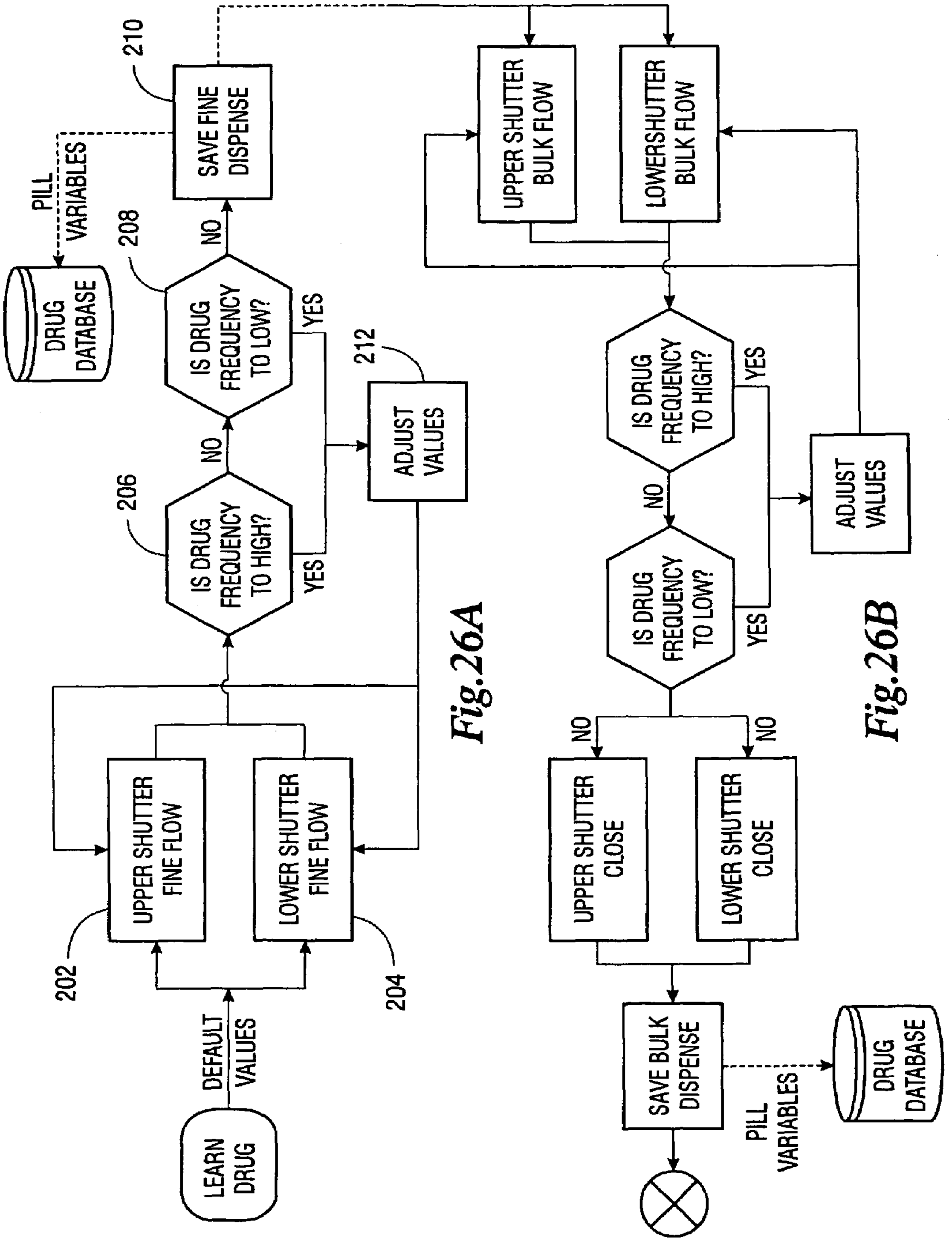
FIGS. 26A and 26B illustrate auto calibration processes.

FIG. 26A illustrates an auto calibration processes which may be utilized to enable the flow control device 16 to "learn" the appropriate settings for a new drug. In steps 202 and 204, the upper shutter minimum and maximum openings, as well as the frequency of operation, and the lower shutter minimum and maximum openings, as well as the frequency of operation, respectively, are set to drug dependent default values. The default values for the minimum and maximum shutter openings can be derived using the drug's dimensions and the equations developed in conjunction with FIG. 13. By knowing the dimensions and shape of the drug, the length and width of the opening needed to allow a drug to fall through can be calculated. A default value for the minimum opening size can be selected to ensure that the drug, regardless of its orientation, is incapable of falling through the opening while a default value for the maximum opening size may be set twenty percent larger than the opening calculated to correspond to pill size. By calculating how long it takes the drug to fall through a shutter opening using the equations developed in conjunction with FIG. 12, a default value for the shutter speed can be calculated.

The default value for the maximum aperture size of the entry aperture may be set at between twenty to forty percent greater than that of the exit aperture. Tests results have shown that the cyclic rate of the upper shutter should normally be set at one-third that of the lower shutter. With those values set, the flow control device 16 is operated and evaluated by a pair of decisions 206 and 208 which determine whether the drug frequency is too high or too low, respectively. If not, the default values are satisfactory and saved at step 210. If, however, drug frequency is too high or too low, the default values are adjusted accordingly at step 212 and the process is repeated until the desired results are obtained. Those of ordinary skill in the art will recognize that the equations needed for calculating aperture size and shutter frequency can be automated in a template driven software routine. In such an embodiment, the user is prompted to provide the information necessary to solve the equations, and the software determines the appropriate default values. It is anticipated that in a commercial embodiment of the present invention, a software library may be provided with precalculated default values for various pill configurations and sizes. An example of the values that may be provided is shown in FIG. 27.

As shown in FIG. 26B, a similar process can be performed for learning to dispense a new drug in a bulk mode.

Figure 27:
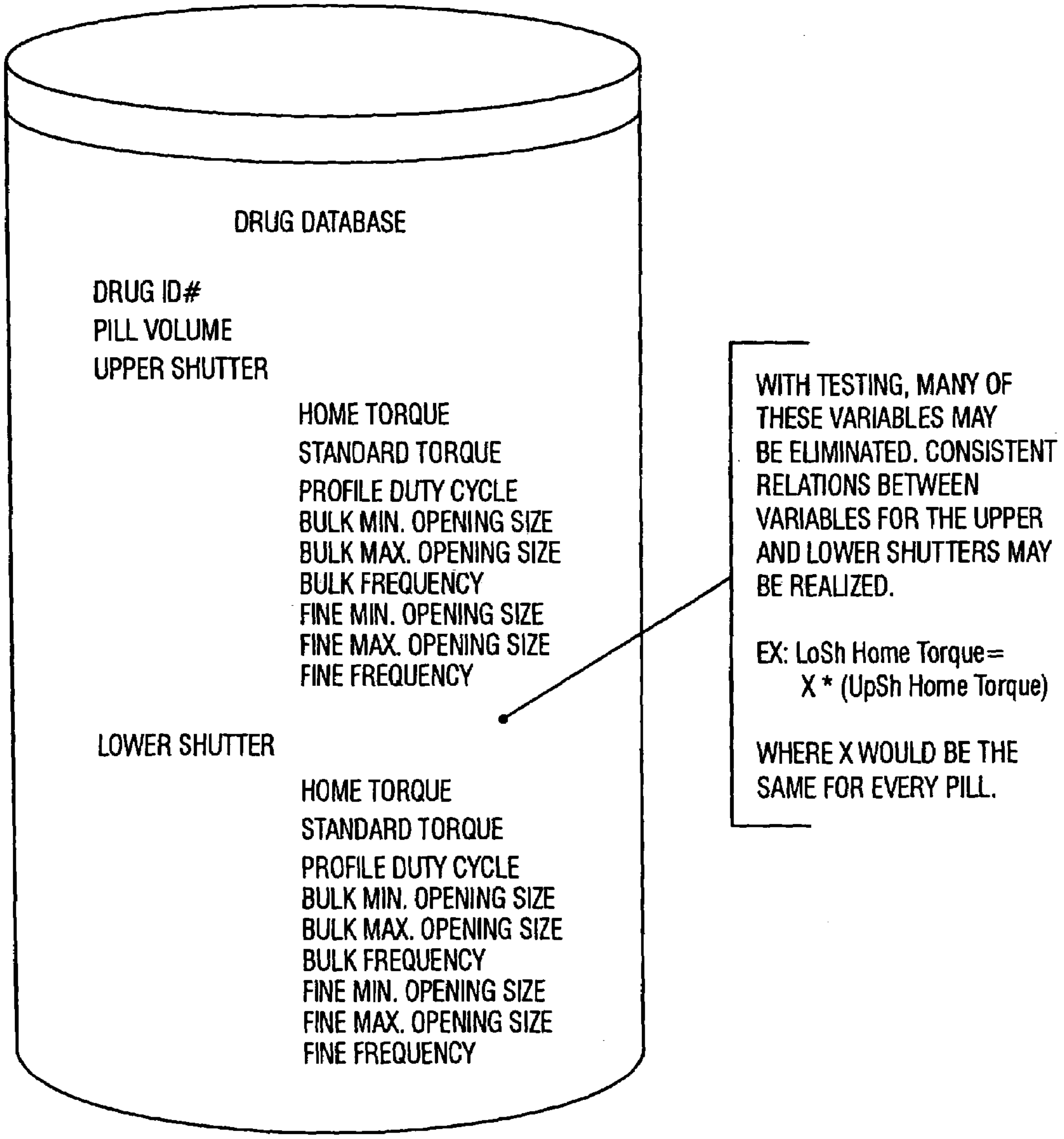
FIG. 27 is an example of information maintained in a drug database.
Figure 28A:
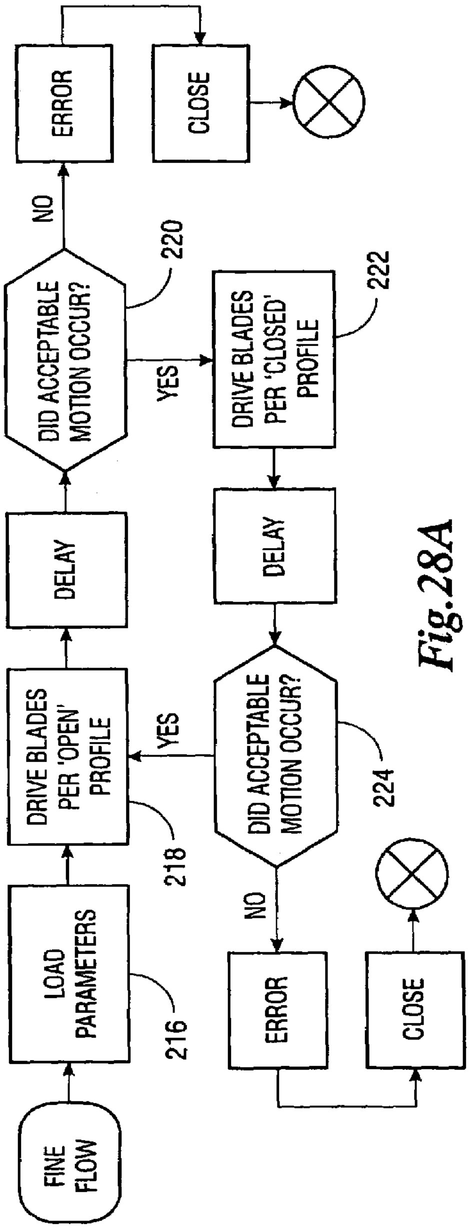
FIGS. 28A and 28B illustrate how the information illustrated in FIG. 27 may be used to operate the flow control device of the present invention.

Finally, FIG. 28A illustrates how the values shown in FIG. 27 may be used. At step 216, the minimum and maximum opening sizes, profile of the duty cycle, etc are loaded. At step 218, the blades are driven according to the loaded parameters so that the shutter openings assume their maximum opening size. Depending upon the frequency of the duty cycle, only the lower blades may be driven, or both the upper and lower blades may be driven. After a delay period, a determination is made as to whether an acceptable amount of motion occurred (e.g., did the shutter openings(s) assume their maximum opening size(s)) at step 220. If that determination is 'yes', the process continues with step 222 where the blades(s) are driven such that the shutter openings(s) assume their minimum opening size(s). After a delay period, a determination is made as to whether an acceptable amount of motion occurred (e.g., did the shutter aperture(s) assume their minimum opening size(s)) at step 224. If an acceptable amount of motion occurred, the process repeats by returning to step 218. If acceptable motion did not occur as determined at either steps 220 or 224, an error message is generated.

Figure 28B:
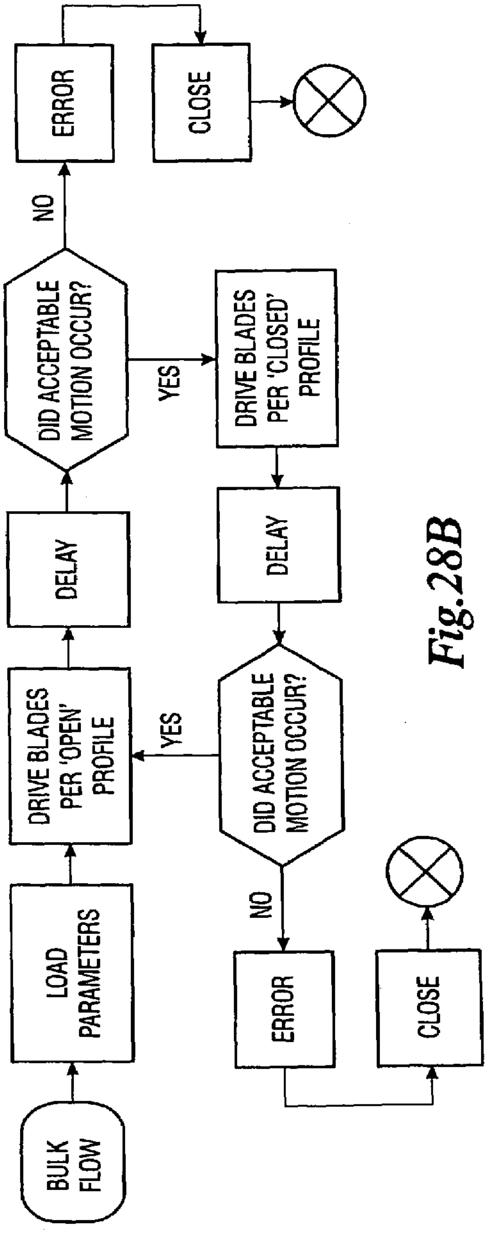

A similar process is shown in FIG. 28B for bulk flow.

While the present invention has been described in connection with preferred embodiments, those of ordinary skill will recognize that many modifications and variations are possible. The present invention is not to be limited to the preferred embodiments, but only by the following claims which are intended to cover all such modifications and variations.

That which is claimed:

1. A method of dispensing articles, comprising:

connecting a flow control device containing a memory device and having an article storage container connected thereto to a station;

interrogating said memory device;

setting the minimum and maximum sizes of an entry aperture of said flow control device based on said interrogating;

setting the minimum and maximum sizes of an exit aperture of said flow control device based on said interrogating;

varying the sizes of said entry aperture and said exit aperture between said minimum and maximum sizes;

determining a number of articles dispensed; and collecting the articles in a receptacle after they have been dispensed.

2. The method of claim 1 additionally comprising controlling said varying based on said determining.

3. The method of claim 1 additionally comprising closing said entry aperture and said exit aperture at the conclusion of said dispensing.

4. The method of claim 3 wherein said entry aperture and said exit aperture cannot be opened upon disconnecting said flow control device from said station.

5. The method of claim 1 additionally comprising inhibiting said setting, counting and collecting in response to said interrogation identifying a problem.

6. The method of claim 1 wherein said varying is performed in accordance with a duty cycle having a predetermined profile and frequency.

7. The method of claim 6 wherein said varying is performed in accordance with a deadtime between duty cycles.

8. A method, comprising:

connecting a flow control device containing a memory device and having an article storage container connected thereto to a station;

setting the minimum and maximum sizes of an entry aperture of said flow control device based on default values;

setting the minimum and maximum sizes of an exit aperture of said flow control device based on default values;

varying the sizes of said entry aperture and said exit aperture between said minimum and maximum sizes at a frequency based on default values;

determining if articles are dispensed at a desired rate and, if so, saving said default values to said memory device and, if not, adjusting said default values until articles are dispensed at said desired rate.

9. The method of claim 8, further comprising dispensing the articles and closing said entry aperture and said exit aperture at the conclusion of said dispensing.

10. The method of claim 9 wherein said entry aperture and said exit aperture cannot be opened upon disconnecting said flow control device from said station.

11. The method of claim 8 wherein said varying is performed in accordance with a duty cycle having a predetermined profile and frequency.

12. The method of claim 11 wherein said varying is performed in accordance with a deadtime between duty cycles.

* * * * *